(12) United States Patent
Matsuoka et al.

(10) Patent No.: US 9,434,858 B2
(45) Date of Patent: Sep. 6, 2016

(54) HYDROPHILIC COATING AGENT

(71) Applicant: OSAKA ORGANIC CHEMICAL INDUSTRY LTD., Osaka-Shi, Osaka (JP)

(72) Inventors: Kazuyoshi Matsuoka, Kashiwara (JP); Yoshiyuki Saruwatari, Kashiwara (JP); Masayuki Ando, Kashiwara (JP)

(73) Assignee: OSAKA ORGANIC CHEMICAL INDUSTRY LTD., Osaka (JP)

(*) Notice: Subject to any disclaimer, the term of this patent is extended or adjusted under 35 U.S.C. 154(b) by 0 days.

(21) Appl. No.: 14/723,722

(22) Filed: May 28, 2015

(65) Prior Publication Data

US 2015/0259570 A1 Sep. 17, 2015

Related U.S. Application Data

(63) Continuation of application No. PCT/JP2013/081811, filed on Nov. 26, 2013.

(30) Foreign Application Priority Data

Nov. 29, 2012 (JP) ................................ 2012-260435

(51) Int. Cl.

| | | |
|---|---|---|
| *C09D 183/08* | (2006.01) | |
| *C09D 7/12* | (2006.01) | |
| *C09D 133/14* | (2006.01) | |
| *C09D 201/10* | (2006.01) | |
| *C09D 143/04* | (2006.01) | |
| *C08F 230/02* | (2006.01) | |
| *C08F 230/08* | (2006.01) | |

(52) U.S. Cl.
CPC ............... *C09D 183/08* (2013.01); *C09D 7/12* (2013.01); *C09D 133/14* (2013.01); *C09D 143/04* (2013.01); *C09D 201/10* (2013.01); *C08F 230/02* (2013.01); *C08F 230/08* (2013.01)

(58) Field of Classification Search
CPC ... C09D 183/08; C08F 230/02; C08F 230/08
See application file for complete search history.

(56) References Cited

U.S. PATENT DOCUMENTS

| | | | |
|---|---|---|---|
| 7,160,953 B2* | 1/2007 | Bowers | C07F 9/091 525/326.6 |
| 7,632,389 B2* | 12/2009 | Wen | B01J 20/28014 204/601 |
| 2009/0155335 A1* | 6/2009 | O'Shaughnessey | A61L 15/46 424/423 |

FOREIGN PATENT DOCUMENTS

| | | |
|---|---|---|
| JP | 6-166613 A | 6/1994 |
| JP | 2007-39391 A | 2/2007 |
| JP | 2007-246614 A | 9/2007 |
| JP | 2008-213177 A | 9/2008 |
| JP | 2011-219613 A | 11/2011 |
| JP | 2011-219637 A | 11/2011 |
| JP | 2011-236403 A | 11/2011 |
| JP | 2012-7053 A | 1/2012 |
| WO | 2011/162225 A1 | 12/2011 |

OTHER PUBLICATIONS

International Search Report dated Mar. 4, 2014 issued in corresponding application No. PCT/JP2013/081811.

* cited by examiner

*Primary Examiner* — Margaret Moore
(74) *Attorney, Agent, or Firm* — Westerman, Hattori, Daniels & Adrian, LLP

(57) ABSTRACT

A hydrophilic coating agent for use in the formation of a coating film that can keep hydrophilicity, an anti-fogging property and an anti-fogging effect thereof and has water resistance, the coating agent including an alkoxysilyl-group-containing compound, a film which has an anti-fogging property and can be produced by shaping the hydrophilic coating agent into a film-like form; and a product which has an anti-fogging layer formed on the surface thereof, wherein the anti-fogging layer is formed from the hydrophilic coating agent.

14 Claims, No Drawings

HYDROPHILIC COATING AGENT

TECHNICAL FIELD

The present invention relates to a hydrophilic coating agent. More specifically, the present invention relates to a hydrophilic coating agent which is excellent in hydrophilicity, anti-fogging property and retention of anti-fogging property, and which can form a coating film excellent in water resistance, and its use. The hydrophilic coating agent of the present invention is expected to be used in, for example, uses such as an anti-fogging film; an optical article such as an anti-reflection film, an optical filter, a spectacle lens, an optical lens, a prism or a beam splitter; a mirror; an optical article for anti-reflection which is used on the surface of a screen, such as a liquid crystal display, a plasma display, an electroluminescent display, a CRT display or a projection-type television; a window or a body for automobiles and the like; an exterior wall and a window glass of buildings and the like; a body and a window glass of an aircraft and the like; a water section equipment such as a kitchen, a bathroom or a rest room; a solar panel; a touch panel for an LCD monitor and the like; an inside wall of a water pipe; or a primer coating for use in electroplating; and the like.

BACKGROUND ART

As a two liquid-type surface modifying agent which can be suitably used for a surface-modified substrate having desired properties such as hydrophilicity, hydrophobicity, lipophilicity and lipophobicity on its surface, there has been proposed a two liquid-type surface modifying agent composed of a I-type liquid containing an alkoxysilyl group-containing compound having a thiol group and a II-type liquid containing an (meth)acrylic compound (see, for example, Patent Literature 1). As a surface modifying agent having two properties which are contrary to each other, such as a combination of hydrophilicity and hydrophobicity or a combination of lipophilicity and lipophobicity, which can be fixed on a substrate, there has been proposed a two liquid-type surface modifying agent composed of I-type liquid containing an alkoxysilyl group-containing polymer and a silane coupling agent having a thiol group, and a II-type liquid containing an (meth)acrylic monomer (see, for example. Patent Literature 2). As a surface modifying agent which is hardly removed from a substrate even in contacting with water and is capable of forming a thin film having desired properties such as hydrophilicity and water repellency, there has been proposed a surface modifying agent containing a (meth)acrylic polymer having a specific repeating unit and an alkoxysilyl group at the position of at least one terminal (see, for example, Patent Literature 3).

The above-mentioned two liquid-type surface modifying agents can impart desired properties such as hydrophilicity, hydrophobicity, lipophilicity and oil repellency to the surface of a substrate. Therefore, the two liquid-type surface modifying agents have been expected to be applied to various uses such as a medical material, a biocompatible material and an optical material. In addition, the above-mentioned surface modifying agent forms a thin film having properties such as hydrophilicity, hydrophobicity, lipophilicity and lipophobicity. Therefore, the surface modifying agent has been expected to be applied to various uses such as a surface treatment agent for glass, a surface treatment agent for coating, a surface treatment agent for printing, a medical material, a biocompatible material, an optical material, a resin film and a resin sheet.

However, in recent years, there has been desired to develop a hydrophilic coating agent which can form a film comprehensively excellent in hydrophilicity, anti-fogging property, retention of anti-fogging property and water resistance as compared with a film formed by the above-mentioned two liquid-type surface modifying agents and the above-mentioned surface modifying agent.

PRIOR ART LITERATURES

Patent Literatures

Patent Literature 1: Japanese Unexamined Patent Publication No. 2011-219613

Patent Literature 2: Japanese Unexamined Patent Publication No. 2011-219637

Patent Literature 3: Japanese Unexamined Patent Publication No. 2011-236403

SUMMARY OF THE INVENTION

Technical Problem to be Solved by the Invention

The present invention has been accomplished in view of the above-mentioned prior arts. An object of the present invention is to provide a hydrophilic coating agent which can form a film comprehensively excellent in hydrophilicity, anti-fogging property, retention of anti-fogging property and water resistance, and uses in which the hydrophilic coating agent is used. In addition, an object of the present invention is to provide a hydrophilic coating agent which can form a film further excellent in abrasion resistance, and uses in which the hydrophilic coating agent is used.

Means for Solving the Problems

The present invention relates to
(1) a hydrophilic coating agent for forming a film having hydrophilicity characterized in that the hydrophilic coating agent includes an alkoxysilyl group-containing polymer prepared by polymerizing a monomer component containing a betaine monomer and an alkoxysilyl group-containing compound,
(2) the hydrophilic coating agent according to the above-mentioned item (1), wherein the betaine monomer is at least one betaine monomer selected from the group consisting of a sulfoxybetaine monomer, a carboxybetaine monomer and a phosphorylbetaine monomer,
(3) the hydrophilic coating agent according to the above-mentioned item (1), wherein the sulfoxybetaine monomer is a sulfoxybetaine monomer having (meth)acryloyl group,
(4) the hydrophilic coating agent according to the above-mentioned item (2), wherein the sulfoxybetaine monomer is a sulfoxybetaine monomer represented by the formula (I):

[Chem. 1]

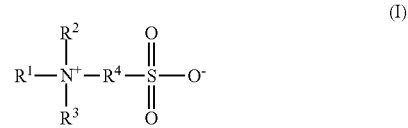

wherein $R^1$ is a (meth)acryloylaminoalkyl group having an alkyl group of 1 to 4 carbon atoms or a (meth)acryloyloxyalkyl group having an alkyl group of 1 to 4 carbon atoms, each of $R^2$ and $R^3$ is independently hydrogen atom, an alkyl group having 1 to 4 carbon atoms, a hydroxyalkyl group having 1 to 4 carbon atoms or a (meth)acryloyloxyalkyl group having an alkyl group of 1 to 4 carbon atoms, and $R^4$ is an alkylene group having 1 to 4 carbon atoms or an oxyalkylene group having 1 to 4 carbon atoms, (5) the hydrophilic coating agent according to the above-mentioned item (4), wherein $R^1$ in the formula (I) is a group represented by the formula (Ia):

[Chem. 2]

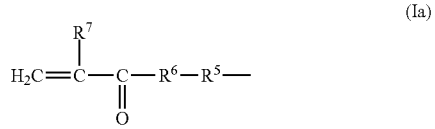

(Ia)

wherein $R^5$ is an alkylene group having 1 to 4 carbon atoms or an oxyalkylene group having 1 to 4 carbon atoms, $R^6$ is oxygen atom or —NH— group, and $R^7$ is hydrogen atom or methyl group, (6) the hydrophilic coating agent according to any one of the above-mentioned items (1) to (5), wherein the carboxybetaine monomer is a carboxybetaine monomer represented by the formula (II):

[Chem. 3]

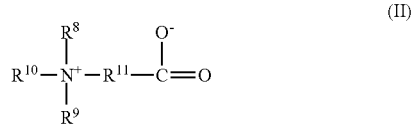

(II)

wherein each of $R^8$ and $R^9$ is independently hydrogen atom or an alkyl group having 1 to 4 carbon atoms, $R^{10}$ is a (meth)acryloyloxyalkyl group having an alkyl group of 1 to 4 carbon atoms, and $R^{11}$ is an alkylene group having 1 to 4 carbon atoms, (7) the hydrophilic coating agent according to any one of the above-mentioned items (2) to (6), wherein the phosphorylbetaine monomer is a phosphorylbetaine monomer represented by the formula (III):

[Chem. 4]

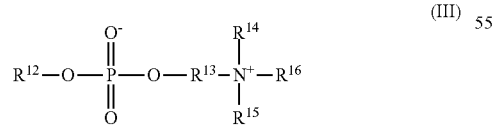

(III)

wherein $R^{12}$ is a (meth)acryloyloxyalkyl group having an alkyl group of 1 to 4 carbon atoms, $R^{13}$ is an alkylene group having 1 to 4 carbon atoms, each of $R^{14}$, $R^{15}$ and $R^{16}$ is independently hydrogen atom or an alkyl group having 1 to 4 carbon atoms, (8) the hydrophilic coating agent according to any one of the above-mentioned items (1) to (7), wherein the alkoxysilyl group-containing polymer has a weight-average molecular weight of not less than 100000, (9) the hydrophilic coating agent according to any one of the above-mentioned items (1) to (8), wherein the hydrophilic coating agent further contains an inorganic salt and/or an organic salt,

(10) a film having anti-fogging property, which is formed by molding the hydrophilic coating agent according to any one of the above-mentioned items (1) to (9), and

(11) a product in which an anti-fogging layer is formed on its surface, and the above-mentioned anti-fogging layer is formed from the hydrophilic coating agent according to any one of the above-mentioned items (1) to (9).

Incidentally, in the present specification, the term "(meth)acryl" means "acryl" or "methacryl", and the term "(meth)acryloyl" means "acryloyl" or "methacryloyl".

Effects of the Invention

According to the present invention, there can be provided a hydrophilic coating agent which can form a film comprehensively excellent in hydrophilicity, anti-fogging property, retention of anti-fogging property and water resistance, and uses in which the hydrophilic coating agent is used. According to the present invention, when the hydrophilic coating agent contains an inorganic salt and/or an organic salt, there are provided a hydrophilic coating agent which can form a film further excellent in abrasion resistance, and uses in which the hydrophilic coating agent is used.

MODE FOR CARRYING OUT THE INVENTION

The hydrophilic coating agent of the present invention is a hydrophilic coating agent for forming a film having hydrophilicity as mentioned above. The hydrophilic coating agent is characterized in that the hydrophilic coating agent contains an alkoxysilyl group-containing polymer which is prepared by polymerizing a monomer component containing a betaine monomer and an alkoxysilyl group-containing compound.

The betaine monomer includes, for example, a sulfoxybetaine monomer, a carboxybetaine monomer, a phosphorylbetaine monomer, and the like. These betaine monomers can be used alone respectively, or at least two kinds thereof can be used in combination. Among these betaine monomers, the sulfoxybetaine monomer is preferable since the sulfoxybetaine monomer is excellent in retention of anti-fogging property.

The sulfoxybetaine monomer includes, for example, a sulfoxybetaine monomer having (meth)acryloyl group and the like, and the present invention is not limited only to those exemplified ones. A preferable sulfoxybetaine monomer includes, for example, a sulfoxybetaine monomer represented by the formula (I):

[Chem. 5]

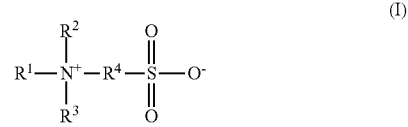

(I)

wherein $R^1$ is a (meth)acryloylaminoalkyl group having an alkyl group of 1 to 4 carbon atoms or a (meth)acryloyloxyalkyl group having an alkyl group of 1 to 4 carbon atoms, each of $R^2$ and $R^3$ is independently hydrogen atom, an alkyl group having 1 to 4 carbon atoms, a hydroxyalkyl group having 1 to 4 carbon atoms or a (meth)acryloyloxyalkyl group having an alkyl group of 1 to 4 carbon atoms, and $R^4$ is an alkylene group having 1 to 4 carbon atoms or an oxyalkylene group having 1 to 4 carbon atoms, and the present invention is not limited only to those exemplified ones. The sulfoxybetaine monomer represented by the formula (I) is preferred from the viewpoint of improvement in abrasion resistance and retention of anti-fogging property of the hydrophilic coating agent of the present invention.

In the formula (I), $R^1$ is a (meth)acryloylaminoalkyl group having an alkyl group of 1 to 4 carbon atoms or a (meth)acryloyloxyalkyl group having an alkyl group of 1 to 4 carbon atoms. The (meth)acryloylaminoalkyl group having an alkyl group of 1 to 4 carbon atoms includes, for example, (meth)acryloylaminomethyl group, (meth)acryloylaminoethyl group, (meth)acryloylaminopropyl group, (meth)acryloylaminobutyl group, and the like. The (meth)acryloyloxyalkyl group having an alkyl group of 1 to 4 carbon atoms includes, for example, (meth)acryloyloxymethyl group, (meth)acryloyloxyethyl group, (meth)acryloyloxypropyl group, (meth)acryloyloxybutyl group, and the like. The present invention is not limited only to those exemplified ones.

In the formula (I), each of $R^2$ and $R^3$ is independently hydrogen atom, an alkyl group having 1 to 4 carbon atoms, a hydroxyalkyl group having 1 to 4 carbon atoms or a (meth)acryloyloxyalkyl group having an alkyl group of 1 to 4 carbon atoms. The alkyl group having 1 to 4 carbon atoms includes, for example, methyl group, ethyl group, propyl group, butyl group, and the like. The hydroxyalkyl group having 1 to 4 carbon atoms includes, for example, hydroxymethyl group, hydroxyethyl group, hydroxypropyl group, hydroxybutyl group, and the like. The (meth)acryloyloxyalkyl group having an alkyl group of 1 to 4 carbon atoms includes, for example, (meth)acryloyloxymethyl group, (meth)acryloyloxyethyl group, (meth)acryloyloxypropyl group, (meth)acryloyloxybutyl group, and the like. The present invention is not limited only to those exemplified ones.

In the formula (I), $R^4$ is an alkylene group having 1 to 4 carbon atoms or an oxyalkylene group having 1 to 4 carbon atoms. The alkylene group having 1 to 4 carbon atoms includes, for example, methylene group, ethylene group, propylene group, butylene group and the like, and the present invention is not limited only to those exemplified ones. The oxyalkylene group having 1 to 4 carbon atoms includes, for example, methoxy group, ethoxy group, propoxy group, butoxy group and the like, and the present invention is not limited only to those exemplified ones.

In the formula (I), it is preferred that $R^1$ is a group represented by the formula (Ia):

[Chem. 6]

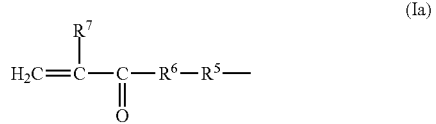

(Ia)

wherein $R^5$ is an alkylene group having 1 to 4 carbon atoms or an oxyalkylene having 1 to 4 carbon atoms, $R^6$ is oxygen atom or —NH— group, and $R^7$ is hydrogen atom or methyl group, from the viewpoint of obtaining a hydrophilic coating agent which can form a film comprehensively excellent in hydrophilicity, anti-fogging property, retention of anti-fogging property and water resistance.

Concrete examples of the sulfoxybetaine monomer represented by the formula (I) include, for example, N-(meth)acryloyloxyalkyl-N,N-dimethylammoniumalkyl-α-sulfobetaines such as N-acryloyloxymethyl-N,N-dimethylammoniummethyl-α-sulfobetaine, N-methacryloyloxymethyl-N,N-dimethylammoniummethyl-α-sulfobetaine, N-acryloyloxymethyl-N,N-dimethylammoniumethyl-α-sulfobetaine, N-methacryloyloxymethyl-N,N-dimethylammoniumethyl-α-sulfobetaine, N-acryloyloxymethyl-N,N-dimethylammoniumpropyl-α-sulfobetaine, N-methacryloyloxymethyl-N,N-dimethylammoniumpropyl-α-sulfobetaine, N-acryloyloxymethyl-N,N-dimethylammoniumbutyl-α-sulfobetaine, N-methacryloyloxymethyl-N,N-dimethylammoniumbutyl-α-sulfobetaine, N-acryloyloxyethyl-N,N-dimethylammoniummethyl-α-sulfobetaine, N-methacryloyloxyethyl-N,N-dimethylammoniummethyl-α-sulfobetaine, N-acryloyloxyethyl-N,N-dimethylammoniummethyl-α-sulfobetaine, N-methacryloyloxyethyl-N,N-dimethylammoniumethyl-α-sulfobetaine, N-acryloyloxyethyl-N,N-dimethylammoniumpropyl-α-sulfobetaine, N-methacryloyloxyethyl-N,N-dimethylammoniumpropyl-α-sulfobetaine, N-acryloyloxyethyl-N,N-dimethylammoniumbutyl-α-sulfobetaine, N-methacryloyloxyethyl-N,N-dimethylammoniumbutyl-α-sulfobetaine, N-acryloyloxypropyl-N,N-dimethylammoniummethyl-α-sulfobetaine, N-methacryloyloxypropyl-N,N-dimethylammoniumethyl-α-sulfobetaine, N-acryloyloxypropyl-N,N-dimethylammoniummethyl-α-sulfobetaine, N-methacryloyloxypropyl-N,N-dimethylammoniummethyl-α-sulfobetaine, N-acryloyloxypropyl-N,N-dimethylammoniumpropyl-α-sulfobetaine, N-methacryloyloxypropyl-N,N-dimethylammoniumpropyl-α-sulfobetaine, N-acryloyloxypropyl-N,N-dimethylammoniumbutyl-α-sulfobetaine, N-methacryloyloxypropyl-N,N-dimethylammoniumbutyl-α-sulfobetaine, N-acryloyloxybutyl-N,N-dimethylammoniummethyl-α-sulfobetaine, N-methacryloyloxybutyl-N,N-dimethylammoniummethyl-α-sulfobetaine, N-acryloyloxybutyl-N,N-dimethylammoniummethyl-α-sulfobetaine, N-methacryloyloxybutyl-N,N-dimethylammoniummethyl-α-sulfobetaine, N-acryloyloxybutyl-N,N-dimethylammoniumpropyl-α-sulfobetaine, N-methacryloyloxybutyl-N,N-dimethylammoniumpropyl-α-sulfobetaine, N-acryloyloxybutyl-N,N-dimethylammoniumbutyl-α-sulfobetaine, and N-methacryloyloxybutyl-N,N-dimethylammoniumbutyl-α-sulfobetaine;

N-(meth)acryloyloxyalkoxyalkoxy-N,N-dimethylammoniumalkyl-α-sulfobetaines such as N-acryloyloxymethoxymethoxy-N,N-dimethylammoniummethyl-α-sulfobetaine, N-methacryloyloxymethoxymethoxy-N,N-dimethylammoniummethyl-α-sulfobetaine, N-acryloyloxymethoxymethoxy-N,N-dimethylammoniumethyl-α-sulfobetaine, N-methacryloyloxymethoxymethoxy-N,N-dimethylammoniumethyl-α-sulfobetaine, N-acryloyloxymethoxymethoxy-N,N-dimethylammoniumpropyl-α-sulfobetaine, N-methacryloyloxymethoxymethoxy-N,N-dimethylammoniumpropyl-α-sulfobetaine, N-acryloyloxymethoxymethoxy-N,N-dimethylammoniumbutyl-α-sulfobetaine, N-methacryloyloxymethoxymethoxy-N,N-dimethylammoniumbutyl-α-sulfobetaine, N-acryloyloxyethoxyethoxy-N,N-dimethylammoniummethyl-α-sulfobetaine, N-methacryloyloxyethoxyethoxy-N,N-dimethylammoniummethyl-α-sulfobetaine, N-acryloyloxyethoxyethoxy-N,N-dimethylammoniumethyl-α-sulfobetaine, N-methacryloyloxyethoxyethoxy-N,N-dimethylammoniummethyl-α-sulfobetaine, N-acryloyloxyethoxyethoxy-N,N-dimethylammoniumpropyl-α-sulfobetaine, N-methacryloyloxyethoxyethoxy-N,N-dimethylammoniumpropyl-α-sulfobetaine, N-acryloyloxyethoxyethoxy-N,N-dimethylammoniumbutyl-α-sulfobetaine, N-methacryloyloxyethoxyethoxy-N,N-dimethylammoniumbutyl-α-sulfobetaine, N-acryloyloxypropoxypropoxy-N,N-dimethylammoniummethyl-α-sulfobetaine, N-methacryloyloxypropoxypropoxy-N,N-dimethylammoniummethyl-α-sulfobetaine, N-acryloyloxypropoxypropoxy-N,N-dimethylammoniumethyl-α-sulfobetaine, N-methacryloyloxypropoxypropoxy-N,N-dimethylammoniumethyl-α-sulfobetaine, N-acryloyloxypropoxypropoxy-N,N-dimethylammoniumpropyl-α-sulfobetaine, N-methacryloyloxypropoxypropoxy-N,N-dimethylammoniumpropyl-α-sulfobetaine, N-acryloyloxypropoxypropoxy-N,N-dimethylammoniumbutyl-α-sulfobetaine, N-methacryloyloxypropoxypropoxy-N,N-dimethylammoniumbutyl-α-sulfobetaine, N-acryloyloxybutoxybutoxy-N,N-dimethylammoniummethyl-α-sulfobetaine, N-methacryloyloxybutoxybutoxy-N,N-dimethylammoniummethyl-α-sulfobetaine, N-acryloyloxybutoxybutoxy-N,N-dimethylammoniumethyl-α-sulfobetaine, N-methacryloyloxybutoxybutoxy-N,N-dimethylammoniumethyl-α-sulfobetaine, N-acryloyloxybutoxybutoxy-N,N-dimethylammoniumpropyl-α-sulfobetaine, N-methacryloyloxybutoxybutoxy-N,N-dimethylammoniumpropyl-α-sulfobetaine, N-acryloyloxybutoxybutoxy-N,N-dimethylammoniumbutyl-α-sulfobetaine, and N-methacryloyloxybutoxybutoxy-N,N-dimethylammoniumbutyl-α-sulfobetaine;

N,N-di(meth)acryloyloxyalkyl-N-methylammoniumalkyl-α-sulfobetaines such as N,N-diacryloyloxymethyl-N-methylammoniummethyl-α-sulfobetaine, N,N-dimethacryloyloxymethyl-N-methylammoniummethyl-α-sulfobetaine, N,N-diacryloyloxymethyl-N-methylammoniumethyl-α-sulfobetaine, N,N-dimethacryloyloxymethyl-N-methylammoniumethyl-α-sulfobetaine, N,N-diacryloyloxymethyl-N-methylammoniumpropyl-α-sulfobetaine, N,N-dimethacryloyloxymethyl-N-methylammoniumpropyl-α-sulfobetaine, N,N-diacryloyloxymethyl-N-methylammoniumbutyl-α-sulfobetaine, N,N-dimethacryloyloxymethyl-N-methylammoniumbutyl-α-sulfobetaine, N,N-diacryloyloxyethyl-N-methylammoniummethyl-α-sulfobetaine, N,N-dimethacryloyloxyethyl-N-methylammoniummethyl-α-sulfobetaine, N,N-diacryloyloxyethyl-N-methylammoniumethyl-α-sulfobetaine, N,N-dimethacryloyloxyethyl-N-methylammoniumethyl-α-sulfobetaine, N,N-diacryloyloxyethyl-N-methylammoniumpropyl-α-sulfobetaine, N,N-dimethacryloyloxyethyl-N-methylammoniumpropyl-α-sulfobetaine, N,N-diacryloyloxyethyl-N-methylammoniumbutyl-α-sulfobetaine, N,N-dimethacryloyloxyethyl-N-methylammoniumbutyl-α-sulfobetaine, N,N-diacryloyloxypropyl-N-methylammoniummethyl-α-sulfobetaine, N,N-dimethacryloyloxypropyl-N-methylammoniummethyl-α-sulfobetaine, N,N-diacryloyloxypropyl-N-methylammoniumethyl-α-sulfobetaine, N,N-dimethacryloyloxypropyl-N-methylammoniumethyl-α-sulfobetaine, N,N-diacryloyloxypropyl-N-methylammoniumpropyl-α-sulfobetaine, N,N-dimethacryloyloxypropyl-N-methylammoniumpropyl-α-sulfobetaine, N,N-diacryloyloxypropyl-N-methylammoniumbutyl-α-sulfobetaine, N,N-dimethacryloyloxypropyl-N-methylammoniumbutyl-α-sulfobetaine, N,N-diacryloyloxybutyl-N-methylammoniummethyl-α-sulfobetaine, N,N-dimethacryloyloxybutyl-N-methylammoniummethyl-α-sulfobetaine, N,N-diacryloyloxybutyl-N-methylammoniumethyl-α-sulfobetaine, N,N-dimethacryloyloxybutyl-N-methylammoniumethyl-α-sulfobetaine, N,N-diacryloyloxybutyl-N-methylammoniumpropyl-α-sulfobetaine, N,N-dimethacryloyloxybutyl-N-methylammoniumpropyl-α-sulfobetaine, N,N-diacryloyloxybutyl-N-methylammoniumbutyl-α-sulfobetaine, and N,N-dimethacryloyloxybutyl-N-methylammoniumbutyl-α-sulfobetaine; and N,N,N-tri(meth)acryloyloxyalkylammoniumalkyl-α-sulfobetaines such as N,N,N-triacryloyloxymethylammoniummethyl-α-sulfobetaine, N,N,N-trimethacryloyloxymethylammoniummethyl-α-sulfobetaine, N,N,N-triacryloyloxymethylammoniumethyl-α-sulfobetaine, N,N,N-trimethacryloyloxymethylammoniumethyl-α-sulfobetaine, N,N,N-triacryloyloxymethylammoniumpropyl-α-sulfobetaine, N,N,N-trimethacryloyloxymethylammoniumpropyl-α-sulfobetaine, N,N,N-triacryloyloxymethylammoniumbutyl-α-sulfobetaine, N,N,N-trimethacryloyloxymethylammoniumbutyl-α-sulfobetaine, N,N,N-triacryloyloxyethylammoniummethyl-α-sulfobetaine, N,N,N-trimethacryloyloxyethylammoniummethyl-α-sulfobetaine, N,N,N-triacryloyloxyethylammoniumethyl-α-sulfobetaine, N,N,N-trimethacryloyloxyethylammoniumethyl-α-sulfobetaine, N,N,N-triacryloyloxyethylammoniumpropyl-α-sulfobetaine, N,N,N-trimethacryloyloxyethylammoniumpropyl-α-sulfobetaine, N,N,N-triacryloyloxyethylammoniumbutyl-α-sulfobetaine, N,N,N-trimethacryloyloxyethylammoniumbutyl-α-sulfobetaine, N,N,N-triacryloyloxypropylammoniummethyl-α-sulfobetaine, N,N,N-trimethacryloyloxypropylammoniummethyl-α-sulfobetaine, N,N,N-triacryloyloxypropylammoniumethyl-α-sulfobetaine, N,N,N-trimethacryloyloxypropylammoniumethyl-α-sulfobetaine, N,N,N-triacryloyloxypropylammoniumpropyl-α-sulfobetaine, N,N,N-trimethacryloyloxypropylammoniumpropyl-α-sulfobetaine, N,N,N-triacryloyloxypropylammoniumbutyl-α-sulfobetaine, and N,N,N-trimethacryloyloxypropylammoniumbutyl-α-sulfobetaine, and the present invention is not limited only to those exemplified ones. These sulfoxybetaine monomers can be used alone respectively, or at least two kinds thereof can be used in combination.

The carboxybetaine monomer includes, for example, a carboxybetaine monomer represented by the formula (II):

[Chem. 7]

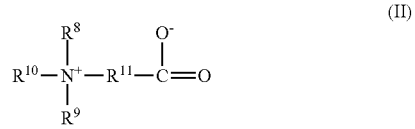

wherein each of $R^8$ and $R^9$ is independently hydrogen atom or an alkyl group having 1 to 4 carbon atoms, $R^{10}$ is a (meth)acryloyloxyalkyl group having an alkyl group of 1 to 4 carbon atoms, and $R^{11}$ is an alkylene group having 1 to 4 carbon atoms, and the like.

In the formula (II), each of $R^8$ and $R^9$ is independently hydrogen atom or an alkyl group having 1 to 4 carbon atoms. The alkyl group having 1 to 4 carbon atoms includes, for example, methyl group, ethyl group, propyl group, butyl group and the like.

In the formula (II), $R^{10}$ is a (meth)acryloyloxyalkyl group having an alkyl group of 1 to 4 carbon atoms. The (meth)acryloyloxyalkyl group having an alkyl group of 1 to 4 carbon atoms includes, for example, (meth)acryloyloxymethyl group, (meth)acryloyloxyethyl group, (meth)acryloyloxypropyl group, (meth)acryloyloxybutyl group and the like.

In the formula (II), $R^{11}$ is an alkylene group having 1 to 4 carbon atoms. The alkylene group having 1 to 4 carbon atoms includes, for example, methylene group, ethylene group, propylene group, butylene group and the like.

Concrete examples of the carboxybetaine monomer represented by the formula (II) includes, for example, N-(meth)acryloyloxyalkyl-N,N-dimethylammonium-α-carboxylbetaines such as N-acryloyloxymethyl-N,N-dimethylammonium-α-carboxylbetaine, N-methacryloyloxymethyl-N,N-dimethylammonium-α-carboxylbetaine, N-acryloyloxyethyl-N,N-dimethylammonium-α-carboxylbetaine, N-methacryloyloxyethyl-N,N-dimethylammonium-α-carboxylbetaine, N-acryloyloxypropyl-N,N-dimethylammonium-α-carboxylbetaine, N-methacryloyloxypropyl-N,N-dimethylammonium-α-carboxylbetaine, N-acryloyloxybutyl-N,N-dimethylammonium-α-carboxylbetaine, and N-methacryloyloxybutyl-N,N-dimethylammonium-α-carboxylbetaine; N,N-di(meth)acryloyloxyalkyl-N-methylammonium-α-carboxylbetaines such as N,N-diacryloyloxymethyl-N-methylammonium-α-carboxylbetaine, N,N-dimethacryloyloxymethyl-N-methylammonium-α-carboxylbetaine, N,N-diacryloyloxyethyl-N-methylammonium-α-carboxylbetaine, N,N-dimethacryloyloxyethyl-N-methylammonium-α-carboxylbetaine, N,N-diacryloyloxypropyl-N-methylammonium-α-carboxylbetaine, N,N-dimethacryloyloxypropyl-N-methylammonium-α-carboxylbetaine, and N,N-diacryloyloxybutyl-N-methylammonium-α-carboxylbetaine, N,N-dimethacryloyloxybutyl-N-methylammonium-α-carboxylbetaine; and N,N,N-tri(meth)acryloyloxyalkylammonium-α-carboxylbetaines such as N,N,N-triacryloyloxymethylammonium-α-carboxylbetaine, N,N,N-trimethacryloyloxymethylammonium-α-carboxylbetaine, N,N,N-triacryloyloxyethylammonium-α-carboxylbetaine, N,N,N-trimethacryloyloxyethylammonium-α-carboxylbetaine, N,N,N-triacryloyloxyprorylammonium-α-carboxylbetaine, N,N,N-trimethacryloyloxyprorylammonium-α-carboxylbetaine, N,N,N-triacryloyloxybutylammonium-α-carboxylbetaine, and N,N,N-trimethacryloyloxybutylammonium-α-carboxylbetaine, and the present invention is not limited only to those exemplified ones. These carboxybetaine monomers can be used alone respectively, or at least two kinds thereof can be used in combination.

The phosphorylbetaine monomer includes, for example, a phosphorylbetaine monomer represented by the formula (III):

wherein $R^{12}$ is a (meth)acryloyloxyalkyl group having an alkyl group of 1 to 4 carbon atoms, $R^{13}$ is an alkylene group having 1 to 4 carbon atoms, and each of $R^{14}$, $R^{15}$ and $R^{16}$ is independently hydrogen atom or an alkyl group having 1 to 4 carbon atoms.

In the formula (III), $R^{12}$ is a (meth)acryloyloxyalkyl group having an alkyl group of 1 to 4 carbon atoms. The (meth)acryloyloxyalkyl group having an alkyl group of 1 to 4 carbon atoms includes, for example, (meth)acryloyloxymethyl group, (meth)acryloyloxyethyl group, (meth)acryloyloxypropyl group, (meth)acryloyloxybutyl group and the like.

In the formula (III), $R^{13}$ is an alkylene group having 1 to 4 carbon atoms. The alkylene group having 1 to 4 carbon atoms includes, for example, methylene group, ethylene group, propylene group, butylene group and the like.

In the formula (III), each of $R^{14}$, $R^{15}$ and $R^{16}$ is independently hydrogen atom or an alkyl group having 1 to 4 carbon atoms. The alkyl group having 1 to 4 carbon atoms includes, for example, methyl group, ethyl group, propyl group, butyl group and the like.

Concrete examples of the phosphorylbetaine monomer represented by the formula (III) include, for example, 2-acryloyloxymethylphosphorylcholine, 2-methacryloyloxymethylphosphorylcholine, 2-acryloyloxyethylphosphorylcholine, 2-methacryloyloxyethylphosphorylcholine, 2-acryloyloxypropylphosphorylcholine, 2-methacryloyloxyprorylphosphorylcholine, 2-acryloyloxybutylphosphorylcholine, 2-methacryloyloxybutylphosphorylcholine and the like.

Incidentally, in the present invention, the monomer component may include other monomer within a scope which would not hinder an object of the present invention.

The other monomer includes, for example, styrene, α-hydroxystyrene, p-hydroxystyrene, methyl (meth)acrylate, ethyl (meth)acrylate, n-butyl (meth)acrylate, isobutyl (meth)acrylate, tert-butyl (meth)acrylate, neopentyl (meth)acrylate, cyclohexyl (meth)acrylate, benzyl (meth)acrylate, octyl (meth)acrylate, lauryl (meth)acrylate, stearyl (meth)acrylate, cetyl (meth)acrylate, ethylcarbitol (meth)acrylate, hydroxyethyl (meth)acrylate, hydroxypropyl (meth)acrylate, hydroxybutyl (meth)acrylate, methoxyethyl (meth)acrylate, methoxybutyl (meth)acrylate, N-methyl(meth)acrylamide, N-ethyl(meth)acrylamide, N-propyl(meth)acrylamide, isopropyl(meth)acrylamide, N-butoxymethyl (meth)acrylamide, N-tert-butyl(meth)acrylamide, N-octyl (meth)acrylamide, N,N-dimethyl(meth)acrylamide, N,N-diethyl(meth)acrylamide, (meth)acryloylmorpholine, diacetone(meth)acrylamide, methyl itaconate, ethyl itaconate, vinyl acetate, vinyl propionate, N-vinylpyrrolidone, N-vinylcaprolactam and the like, and the present invention is not limited only to those exemplified ones. These other monomers can be used alone respectively, or at least two kinds thereof can be used in combination.

The amount of the other monomer which can be included in the monomer component cannot be absolutely determined because the amount is different depending on the kind of the other monomer. It is preferred that the amount of the other monomer is controlled within a scope which would not hinder an object of the present invention.

The alkoxysilyl group-containing compound includes, for example, an alkoxysilyl group-containing compound represented by the formula (IV):

[Chem. 8]

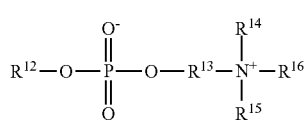

(III)

[Chem. 9]

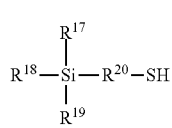

(IV)

wherein each of $R^{17}$, $R^{18}$ and $R^{19}$ is independently an alkyl group having 1 to 4 carbon atoms or an alkoxy group having 1 to 4 carbon atoms, and at least one of $R^{17}$, $R^{18}$ and $R^{19}$ is an alkoxy group having 1 to 4 carbon atoms, and $R^{20}$ is an alkylene group having 1 to 12 carbon atoms; an azobis(trialkoxysilyl) compound represented by the formula (V):

[Chem. 10]

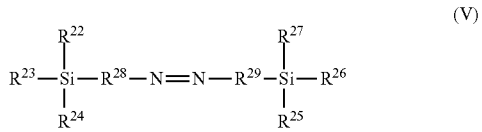

(V)

wherein each of $R^{22}$ to $R^{27}$ is independently an alkyl group having 1 to 4 carbon atoms or an alkoxy group having 1 to 4 carbon atoms, and at least one of $R^{22}$ to $R^{27}$ is an alkoxy group having 1 to 4 carbon atoms, and each of $R^{28}$ and $R^{29}$ is independently an alkylene group having 1 to 12 carbon atoms, and one or two methylene groups included in the alkylene group can be substituted with —O— group, —C(O)O— group, —O(O)C— group, —NH— group, —CO— group, an arylene group, urethane bond or 1,2-imidazoline group; 2,2'-azobis[2-(1-(triethoxysilylpropyl-carbamoyl)-2-imidazoline-2-yl)propane], 2,2'-azobis[N-[2-(triethoxysilylpropylcarbamoyl)ethyl]isobutylamide] and the like, and the present invention is not limited only to those exemplified ones. These alkoxysilyl group-containing compounds can be used alone respectively, or at least two kinds thereof can be used in combination.

Concrete examples of the alkoxysilyl group-containing compound represented by the formula (IV) includes, for example, 2-mercaptomethyltrimethoxysilane, 2-mercaptoethyltrimethoxysilane, 2-mercaptopropyltrimethoxysilane, 2-mercaptobutyltrimethoxysilane, 2-mercaptomethyltriethoxysilane, 2-mercaptoethyltriethoxysilane, 2-mercaptopropyltriethoxysilane, 2-mercaptobutyltriethoxysilane, 2-mercaptomethyltripropoxysilane, 2-mercaptoethyltripropoxysilane, 2-mercaptopropyltripropoxysilane, 2-mercaptobutyltripropoxysilane, 2-mercaptomethyltributoxysilane, 2-mercaptoethyltributoxysilane, 2-mercaptopropyltributoxysilane, 2-mercaptobutyltributoxysilane and the like, and the present invention is not limited only to those exemplified ones. These alkoxysilyl group-containing compounds can be used alone respectively, or at least two kinds thereof can be used in combination.

Concrete examples of the alkoxysilyl group-containing compound represented by the formula (V) includes, for example, 2,2'-azobis[2-(1-(trimethoxysilylpropylcarbamoyl)-2-imidazoline-2-yl)propane], 2,2'-azobis[2-(1-(triethoxysilylpropylcarbamoyl)-2-imidazoline-2-yl)propane], 2,2'-azobis[2-(1-(tripropoxysilylpropylcarbamoyl)-2-imidazoline-2-yl)propane], 2,2'-azobis[N-[2-(trimethoxysilyl propylcarbamoyl)ethyl]isobutylamide], 2,2'-azobis[N-[2-(triethoxysilylpropylcarbamoyl)ethyl]isobutylamide], 2,2'-azobis[N-[2-(tripropoxysilylpropylcarbamoyl)ethyl]isobutylamide] and the like, and the present invention is not limited only to those exemplified ones. These alkoxysilyl group-containing compounds can be used alone respectively, or at least two kinds thereof can be used in combination.

Among the alkoxysilyl group-containing compounds, the alkoxysilyl group-containing compound represented by the formula (V) is preferred from the viewpoint of improvement in abrasion resistance of the hydrophilic coating agent of the present invention.

The amount of the alkoxysilyl group-containing compound per 100 parts by mass of the monomer component to be polymerized is preferably not less than 0.01 parts by mass, more preferably not less than 0.03 parts by mass and furthermore preferably not less than 0.3 parts by mass from the viewpoint of improvement in water resistance and abrasion resistance, and preferably not more than 30 parts by mass, more preferably not more than 20 parts by mass and furthermore preferably not more than 10 parts by mass from the viewpoint of improvement in anti-fogging property.

When the monomer component is polymerized, it is preferred that a polymerization initiator is used from the viewpoint of acceleration of polymerization reaction of the monomer component. The polymerization initiator includes, for example, azoisobutyronitrile, azoisomethyl butyrate, azobisdimethylvaleronitrile, benzoyl peroxide, potassium persulfate, ammonium persulfate, benzophenone derivatives, phosphineoxide derivatives, benzoketone derivatives, phenylthio ether derivatives, azide derivatives, diazo derivatives, disulfide derivatives and the like, and the present invention is not limited only to those exemplified ones. The polymerization initiators can be used alone, or at least two kinds thereof can be used in combination.

The amount of the polymerization initiator is not particularly limited, and it is preferred that the amount of the polymerization initiator is usually 0.01 to 5 parts by mass or so per 100 parts by mass of all of the monomer component to be polymerized.

A method for polymerizing monomer component includes, for example, a solution polymerization method and the like, and the present invention is not limited only to the exemplified one. When the monomer component is polymerized by the solution polymerization method, the monomer component can be polymerized, for example, by dissolving the monomer component in a solvent, and adding a polymerization initiator to the resulting solution while stirring the solution.

The solvent includes, for example, water such as pure water, alcohols such as methyl alcohol, ethyl alcohol, isopropyl alcohol, ethylene glycol and propylene glycol, ketones such as acetone and methyl ethyl ketone, ethers such as diethyl ether and tetrahydrofuran, aromatic hydrocarbon compounds such as benzene, toluene and xylene, aliphatic hydrocarbon compounds such as n-hexane, alicyclic hydrocarbon compounds such as cyclohexane, acetates such as methyl acetate and ethyl acetate, and the like, and the present invention is not limited only to those exemplified ones. These solvents can be used alone respectively, or at least two kinds thereof can be used in combination.

It is preferred that the amount of the solvent is controlled so that the concentration of the monomer component in a solution prepared by dissolving the monomer component in a solvent is 10 to 80% by weight or so.

When the monomer component is polymerized, it is preferred that polymerization conditions such as a polymerization temperature and a polymerization period of time are properly controlled in accordance with the kind and amount of monomers used in the monomer component, the kind and amount of a polymerization initiator, and the like.

When the monomer component is polymerized, it is preferred that the atmosphere is an inert gas. The inert gas includes, for example, nitrogen gas, argon gas and the like, and the present invention is not limited only to those exemplified ones.

The termination of a polymerization reaction, and presence or absence of an unreacted monomer in the reaction system can be confirmed, for example, by a general analytical method such as gas chromatography.

An alkoxysilyl group-containing polymer can be obtained by polymerizing the monomer component as mentioned above. Incidentally, the weight-average molecular weight of the alkoxysilyl group-containing polymer can be determined, for example, by gel permeation chromatography and the like.

The weight-average molecular weight of the alkoxysilyl group-containing polymer is preferably not less than 100000, more preferably not less than 130000, furthermore preferably not less than 150000 and even more preferably not less than 170000 from the viewpoint of improvement in abrasion resistance of the hydrophilic coating agent of the present invention, and preferably not more than 1000000 and more preferably not more than 500000 from the viewpoint of improvement in solubility of the alkoxysilyl group-containing polymer.

Among the alkoxysilyl group-containing polymers, an alkoxysilyl group-containing polymer obtained by polymerizing a monomer component containing a sulfoxybetaine monomer and an alkoxysilyl group-containing compound is preferred, and an alkoxysilyl group-containing polymer having a weight-average molecular weight of not less than 100000 is more preferred in the present invention, since the alkoxysilyl group-containing polymer is excellent in retention of anti-fogging property.

The hydrophilic coating agent of the present invention contains the above-mentioned alkoxysilyl group-containing polymer.

It is preferred that the hydrophilic coating agent of the present invention further contains an inorganic salt and/or an organic salt from the viewpoint of improvement in retention of anti-fogging property and abrasion resistance of the hydrophilic coating agent of the present invention. Incidentally, the inorganic salt and the organic salt can be used alone respectively, or can be used in combination.

The inorganic salt includes, for example, sodium chloride, potassium chloride, ammonium chloride, sodium hydrogencarbonate, ammonium hydrogencarbonate, sodium carbonate, potassium carbonate, ammonium carbonate, sodium sulfate, potassium sulfate, ammonium sulfate, sodium nitrate, potassium nitrate, ammonium nitrate, sodium chlorate, potassium chlorate, ammonium chlorate and the like, and the present invention is not limited only to those exemplified ones. These inorganic salts can be used alone respectively, or can be used in combination.

The organic salt includes, for example, a cationic surfactant such as an alkyltrimethylammonium salt, an alkoxyalkyltrimethylammonium salt, a dialkyldimethylammonium salt, an alkyldimethylamine salt, an alkoxyalkyldimethylamine salt and an alkylamidealkyldimethylamine salt; an anionic surfactant such as an alkylbenzenesulfonic acid salt, an alkyl ether sulfate salt, an alkenyl ethersulfate salt, an alkyl sulfate salt, an alkenyl sulfate salt, an olefin sulfonate salt, an alkane sulfonate salt, an unsaturated fatty acid salt, an alkyl ether carboxylate salt, an alkenyl ether carboxylate salt, an α-sulfofatty acid alkyl ester salt, an amino acid type surfactant, an N-acylamino acid type surfactant, an alkyl acidic phosphoric acid ester, an alkenyl acidic phosphoric acid ester, an alkylphosphoric acid ester salt and an alkenylphosphoric acid ester salt; and the like, and the present invention is not limited only to those exemplified ones. These organic salts can be used alone respectively, or at least two kinds thereof can be used in combination.

Among the inorganic salts and the organic salts, the inorganic salts are preferred, and an alkali metal salt is more preferred from the viewpoint of improvement in abrasion resistance of the hydrophilic coating agent of the present invention. Among the alkali metal salts, a sodium salt is preferred, and sodium chloride, sodium hydrogencarbonate, sodium carbonate, sodium nitrate and sodium chlorate are more preferred, and sodium chloride, sodium hydrogencarbonate and sodium carbonate are furthermore preferred. These salts can be used alone respectively, or at least two kinds thereof can be used in combination.

The amount of the inorganic salt and/or the organic salt, preferably the inorganic salt per 100 parts by mass of the alkoxysilyl group-containing polymer is preferably not less than 1 part by mass, more preferably not less than 3 parts by mass from the viewpoint of improvement in abrasion resistance of the hydrophilic coating agent of the present invention, and preferably not more than 70 parts by mass, more preferably not more than 60 parts by mass, furthermore preferably not more than 50 parts by mass, still more preferably not more than 40 parts by mass from the viewpoint of improvement in transparency of the hydrophilic coating agent of the present invention.

The hydrophilic coating agent of the present invention can be composed only of the above-mentioned alkoxysilyl group-containing polymer, or may contain other kind monomer within a scope which would not hinder an object of the present invention. In addition, the hydrophilic coating agent of the present invention may contain a solvent as occasion demands.

The solvent includes, for example, water such as pure water, alcohols such as methyl alcohol, ethyl alcohol, isopropyl alcohol, ethylene glycol and propylene glycol, ketones such as acetone and methyl ethyl ketone, ethers such as diethyl ether and tetrahydrofuran, aromatic hydrocarbon compounds such as benzene, toluene and xylene, aliphatic hydrocarbon compounds such as n-hexane, alicyclic hydrocarbon compounds such as cyclohexane, acetates such as methyl acetate and ethyl acetate, and the like, and the present invention is not limited only to those exemplified ones. These solvents can be used alone respectively, or at least two kinds thereof can be used in combination. Among these solvents, it is preferred to use a solvent having a property for dissolving the inorganic salt and/or the organic salt when the inorganic salt and/or the organic salt are used.

The amount of the solvent is not particularly limited, and it is preferred that the amount is adjusted so that a solution prepared by dissolving the alkoxysilyl group-containing polymer in a solvent has a concentration of the alkoxysilyl group-containing polymer of 10 to 80% by weight or so.

The hydrophilic coating agent of the present invention can be suitably used, for example, in a film having anti-fogging property, that is, an anti-fogging film. The anti-fogging film can be obtained by molding the hydrophilic coating agent of the present invention into a film.

A method for producing the anti-fogging film includes, for example, a method for producing an anti-fogging film, which includes coating the hydrophilic coating agent of the present invention on a support, to form a coating film, and thereafter removing a solvent from the formed coating film, and the like. The present invention is not limited only to the exemplified one.

The method for coating the hydrophilic coating agent of the present invention on a support includes, for example, a roll coating method, a gravure coating method, a spin coating method, a doctor blade method, and the like. The present invention is not limited only to those exemplified ones. The above-mentioned support includes, for example, a resin plate made of a resin such as polyester, a metal plate such as stainless steel plate, and the like. The present invention is not limited only to those exemplified ones.

Incidentally, when a solvent is removed from a formed coating film, the formed coating film can be heated as occasion demands. Its heating temperature can be controlled to a temperature at which a solvent contained in the formed coating film can be evaporated, and the temperature is usually preferably 30 to 300° C., more preferably 40 to 250° C., furthermore preferably 50 to 230° C. Its heating period of time cannot be absolutely determined because the heating period of time differs depending on the heating temperature and the like. The heating period of time is usually 10 minutes to 5 hours or so. The heating can be carried out in one stage or in multi-stage of at least two stages. As its embodiments, there can be cited, for example, a method which includes drying a formed coating film at a temperature of 30 to 80° C. for 10 minutes to 2 hours, and thereafter heating the formed coating film at a temperature of 100 to 250° C. for additional 10 minutes to 2 hours, and the like. The atmosphere where the formed coating film is heated can be the air or an inert gas such as nitrogen gas. In addition, the pressure of the atmosphere where the foamed coating film is heated can be an atmospheric pressure or a reduced pressure.

The anti-fogging film formed in the above can be used by separating the anti-fogging film from a support. In some cases, the anti-fogging film can be used without separating the anti-fogging film from a support.

The thickness of the anti-fogging film after drying is not particularly limited, and is preferably 1 to 500 µm, more preferably 2 to 300 µm, furthermore preferably 3 to 200 µm and even more preferably 5 to 150 µm from the viewpoint of increase in film strength and giving flexibility.

Since the anti-fogging film of the present invention is comprehensively excellent in hydrophilicity, anti-fogging property, retention of anti-fogging property and water resistance, the anti-fogging film of the present invention can be suitably used, for example, as a film for a light guiding plate, a polarization plate, a film for a display, a film for an optical disk, a transparent electric conductive film, a film for a touch panel, a waveguide plate, and the like.

The hydrophilic coating agent of the present invention can be applied to various substrates. Among the substrates, a substrate having hydroxyl groups on its surface, a substrate on which silica is vapor deposited and the like can be suitably used from the viewpoint of chemical fix of the alkoxysilyl group-containing polymer contained in the hydrophilic coating agent of the present invention on a substrate.

The material of the substrate includes, for example, polyethylene, polypropylene, polystyrene, polyvinyl chloride, polyamide represented by nylon, polyimide, polyurethane, urea resin, polylactic acid, polyvinyl alcohol, polyvinyl acetate, acrylic resin, polysulfone, polycarbonate, ABS resin, AS resin, silicone resin, glass, ceramic, metal and the like, and the present invention is not limited only to those exemplified ones.

The hydrophilic coating agent of the present invention is fixed firmly on a substrate having hydroxyl groups on its surface. Therefore, it is preferred that the hydrophilic coating agent is applied to a substrate having hydroxyl groups on its surface. When a substrate not having hydroxyl groups on its surface is used, it is preferred that the surface of the substrate is modified so that the surface has hydroxyl groups on its surface. Incidentally, when hydroxyl groups sufficiently exist on the surface of a substrate such as a substrate made of glass, it is needless to say that the surface of a substrate does not have to be modified so as to have hydroxyl groups on its surface.

The hydrophilic coating agent of the present invention can be firmly fixed on the surface of a substrate, even when a substrate on which silica is vapor deposited is used as a substrate. When a substrate on which silica is vapor deposited is made of a resin such as polyethylene, polypropylene, polystyrene, polyvinyl chloride, polyamide represented by nylon, polyimide, polyurethane, urea resin, polylactic acid, polyvinyl alcohol, polyvinyl acetate, acrylic resin, polysulfone, polycarbonate, ABS resin, AS resin or silicone resin, it is considered that it will be difficult to fix the hydrophilic coating agent firmly on the surface of a substrate made of the resin (hereinafter referred to as resin substrate), because the resin usually has hydrophobicity. In contrast, when silica is vapor deposited on the surface of the above-mentioned resin substrate in the present invention, the hydrophilic coating agent of the present invention can be fixed firmly on the resin substrate on which silica is vapor deposited.

A method for vapor depositing silica on the surface of a resin substrate includes, for example, a vacuum evaporation method, a sputtering method, a chemical vapor deposition method and the like, and the present invention is not limited only to those exemplified ones. When silica is vapor deposited on the surface of a resin substrate by, for example, a vacuum evaporation method, silica can be fixed on the surface of a resin substrate by putting the resin substrate in a vacuum vessel, deaerating the vacuum vessel under heating, and thereafter introducing vapor of an alkoxysilane such as tetramethoxysilane into the vacuum vessel.

The amount of silica which is vapor deposited on the surface of a resin substrate cannot be absolutely decided because the amount differs depending on the kind of a resin which is used in the resin substrate, and the like. Therefore, it is preferred that the amount is appropriately determined in accordance with the kind of the resin, and the like. The amount of silica can be usually an amount necessary for fixing the hydrophilic coating agent of the present invention on the surface of a resin substrate on which silica is vapor deposited.

The shape of the substrate is not particularly limited, and includes, for example, a film, a sheet, a plate, a rod, a molded body having a predetermined shape, and the like. The present invention is not limited only to those exemplified ones.

A method for coating the substrate with the hydrophilic coating agent of the present invention includes, for example, a flow coating method, a spray coating method, a dip coating method, a brush coating method, a roll coating method and the like, and the present invention is not limited only to those exemplified ones.

The atmosphere where the hydrophilic coating agent of the present invention is applied to a substrate can be usually the air. In addition, when a substrate is coated with the hydrophilic coating agent of the present invention, its temperature can be usually room temperature or a raised temperature. When a substrate is coated with the hydrophilic coating agent of the present invention, the coating amount of the hydrophilic coating agent of the present invention cannot be absolutely determined, because the amount differs depending on uses of the substrate and the like. Therefore, it is preferred that the coating amount is properly controlled in accordance with its uses and the like. After the application of the hydrophilic coating agent of the present invention to a substrate, it is preferred that the substrate is heated from the viewpoint of increase in productive efficiency. The temperature for heating a substrate cannot be absolutely determined because the temperature differs depending on heat-resistant temperature of a substrate and the like, and it is preferred that the temperature is controlled to a temperature suitable for the substrate, which is usually within a range of 50 to 150° C.

After coating a substrate with the hydrophilic coating agent of the present invention and drying the hydrophilic coating agent, the thickness of the dried film is not particularly limited. The thickness of the dried film is preferably 1 to 500 μm, more preferably 2 to 300 μm, furthermore preferably 3 to 200 μm and even more preferably 5 to 150 μm from the viewpoint of increase in film strength and giving flexibility.

As mentioned above, a film made of the hydrophilic coating agent of the present invention can be formed on the surface of a substrate by coating the substrate with the hydrophilic coating agent of the present invention.

The film formed by coating a substrate with the hydrophilic coating agent of the present invention is comprehensively excellent in hydrophilicity, anti-fogging property, retention of anti-fogging property and water resistance. In addition, since the film formed by coating a substrate with the hydrophilic coating agent of the present invention is fixed to the substrate, it can be prevented that the film is washed away when water is attached to the film, which has occurred when a conventional surfactant is used.

Furthermore, a film formed by coating a substrate with the hydrophilic coating agent of the present invention, which contains an inorganic salt and/or an organic salt is excellent in hydrophilicity, because the film absorbs moisture included in the air, and a thin water film is formed on the surface of the film. In addition, when the weight-average molecular weight of the alkoxysilyl group-containing polymer contained in the hydrophilic coating agent of the present invention is not less than 100000, and the hydrophilic coating agent contains an inorganic salt and/or an organic salt, retention of anti-fogging property and abrasion resistance of the hydrophilic coating agent of the present invention can be furthermore improved.

Furthermore, since the surface of a substrate can be modified only by coating the surface with the hydrophilic coating agent of the present invention, the hydrophilic coating agent of the present invention has an advantage such that a substrate of which surface is modified on its surface can be easily produced in a short period of time.

Therefore, when the hydrophilic coating agent of the present invention is applied to the surface of various products to form anti-fogging layer, there can be obtained a product having total excellency in hydrophilicity, anti-fogging property, retention of anti-fogging property and water resistance.

Uses of the hydrophilic coating agent of the present invention includes, for example, the above-mentioned anti-fogging film; an optical article such as an anti-reflection film, an optical filter, a spectacle lens, an optical lens, a prism or a beam splitter; a mirror; an optical article for anti-reflection which is used on the surface of a screen, such as a liquid crystal display, a plasma display, an electroluminescent display, a CRT display or a projection-type television; a window or a body for automobiles and the like; an exterior wall and a window glass of buildings and the like; a body and a window glass of an aircraft and the like; a water section equipment such as a kitchen, a bathroom or a rest room; a solar panel; a touch panel for an LCD monitor and the like; an inside wall of a water pipe; or a primer coating for use in electroplating; and the like. The present invention is not limited only to those exemplified ones.

EXAMPLES

Next, the present invention will be more specifically described by the following working examples of the present invention, but the present invention is not limited only to those examples.

Preparation Example 1

To a flask having a volume of 30 mL, equipped with a nitrogen gas conduit, a condenser and a stirrer were added 2.5 g of 2,2'-azobis[2-methyl-N-(2-hydroxyethyl)propionamide] (manufactured by Wako Pure Chemical Industries, Ltd., item number: VA-086, molecular weight: 288.35), 10.4 g of dimethylsulfoxide and 4.7 g of 3-isocyanatepropyltriethoxysilane (manufactured by Shin-Etsu Chemical Co., Ltd., item number: KBE-9007, molecular weight: 247.37). The contents in the flask were heated while stirring. When the temperature of a reaction solution attained to 50° C., 0.001 g of dibutyltin dilaurate (manufactured by Daiichi Sankyo Chemical Pharma, item number: STANN BL, molecular weight: 631.56) was added to the flask, and the reaction was carried out by aging for 4 hours. The obtained reaction solution was cooled to 20° C., and 20 g of methyl ethyl ketone and 10 g of pure water were added to the flask. The solution was stirred for 10 minutes. Thereafter, the contents in the flask were allowed to stand for 5 minutes, and an organic layer was separated from the contents with a separatory funnel. The resulting organic layer was dried under reduced pressure, to give 6.8 g of 2,2'-azobis[N-[2-(triethoxysilylpropylcarbamoyl)ethyl]isobutylamide.

Example 1

To a flask having a volume of 500 mL, equipped with a nitrogen gas conduit, a condenser and a stirrer were added 24 g of N-acryloylaminopropyl-N,N-dimethylammoniumpropyl-α-sulfoxybetaine (manufactured by Sigma-Aldrich Co. LLC., item number: 473160-5G) and 56 g of ethanol. The pressure in the flask was reduced to remove the air from the flask, and thereafter the pressure in the flask was recovered to atmospheric pressure by introducing nitrogen gas into the flask, to remove oxygen gas from the flask as much as possible.

Next, the contents in the flask were warmed up to 65° C. in an oil bath with which the flask was equipped, and thereafter 0.05 g of 2,2'-azobis[N-[2-(triethoxysilylpropylcarbamoyl)ethyl]isobutylamide] obtained in Preparation Example 1 was added to the flask. The contents in the flask were aged while maintaining its temperature to 70° C. for 4 hours. Thereafter, 0.24 g of 2,2'-azobis[N-[2-(triethoxysilylpropylcarbamoyl)ethyl]isobutylamide] was added to the flask, and the contents in the flask were aged for 4 hours while maintaining the temperature of the contents to 70° C., to give a polymer solution.

The polymer solution obtained in the above was cooled to 30° C. in a water bath, and the polymer solution was diluted with 360 g of water and 37.7 g of ethanol, to give a transparent alkoxysilyl group-containing polymer solution.

The weight-average molecular weight of the alkoxysilyl group-containing polymer contained in the alkoxysilyl group-containing polymer solution obtained in the above was determined by using a gel permeation chromatography (manufactured by Tosoh Corporation, item number: HLC- 8320GPC). As a result, the weight-average molecular weight of the alkoxysilyl group-containing polymer was 180000. This alkoxysilyl group-containing polymer solution was used as a hydrophilic coating agent.

Example 2

To the alkoxysilyl group-containing polymer solution obtained in Example 1, sodium chloride was added in a ratio of 10 parts by mass based on 100 parts by mass of the alkoxysilyl group-containing polymer, and the solution was stirred so as to be homogeneous, to give an alkoxysilyl group-containing polymer solution to which sodium chloride was added. The obtained alkoxysilyl group-containing polymer solution to which sodium chloride was added was transparent. This polymer solution was used as a hydrophilic coating agent.

Example 3

An alkoxysilyl group-containing polymer solution to which sodium sulfate was added was obtained in the same manner as in Example 2, except that 10 parts by mass of sodium sulfate was used in place of 10 parts by mass of sodium chloride. The obtained alkoxysilyl group-containing polymer solution to which sodium sulfate was added was transparent. This polymer solution was used as a hydrophilic coating agent.

Example 4

An alkoxysilyl group-containing polymer solution to which sodium hydrogen carbonate was added was obtained in the same manner as in Example 2, except that 10 parts by mass of sodium hydrogen carbonate was used in place of 10 parts by mass of sodium chloride. The obtained alkoxysilyl group-containing polymer solution to which sodium hydrogen carbonate was added was transparent. This polymer solution was used as a hydrophilic coating agent.

Example 5

An alkoxysilyl group-containing polymer solution to which sodium chloride was added was obtained in the same manner as in Example 2, except that the amount of sodium chloride was changed from 10 parts by mass to 30 parts by mass. The obtained alkoxysilyl group-containing polymer solution to which sodium chloride was added was transparent. This polymer solution was used as a hydrophilic coating agent.

Example 6

An alkoxysilyl group-containing polymer solution to which sodium chloride was added was obtained in the same manner as in Example 2, except that the amount of sodium chloride was changed from 10 parts by mass to 50 parts by mass. The obtained alkoxysilyl group-containing polymer solution to which sodium chloride was added was transparent slightly tinged with white. This polymer solution was used as a hydrophilic coating agent.

Example 7

To a flask having a volume of 500 mL, equipped with a nitrogen gas conduit, a condenser and a stirrer were added 49 g of N-acryloylaminopropyl-N,N-dimethylammonium-propyl-α-sulfoxybetaine, 0.35 g of 3-mercaptopropyltrimethoxysilane (manufactured by Shin-Etsu Chemical Co., Ltd., item number: KBM-803) as a silane coupling agent and 49.35 g of pure water. The pressure in the flask was reduced to remove the air from the flask, and thereafter the pressure in the flask was recovered to atmospheric pressure by introducing nitrogen gas into the flask, to remove oxygen gas from the flask as much as possible.

Next, the contents in the flask were warmed up to 65° C. in an oil bath with which the flask was equipped, and thereafter 0.05 g of 2,2'-azobis[2-methyl-N-(2-hydroxyethyl)propionamide] (manufactured by Wako Pure Chemical Industries, Ltd., item number: VA-086, molecular weight: 288.35) was added to the flask. The contents in the flask were aged while maintaining its temperature to 70° C. for 4 hours. Thereafter, 0.49 g of 2,2'-azobis[2-methyl-N-(2-hydroxyethyl)propionamide] was added to the flask, and the contents in the flask were aged for 4 hours while maintaining the temperature of the contents to 70° C., to give a polymer solution.

The polymer solution obtained in the above was cooled to 30° C. in a water bath, and the polymer solution was diluted with 394.8 g of water, to give a transparent alkoxysilyl group-containing polymer solution.

The weight-average molecular weight of the alkoxysilyl group-containing polymer contained in the alkoxysilyl group-containing polymer solution obtained in the above was determined by using a gel permeation chromatography (manufactured by Tosoh Corporation, item number: HLC-8320GPC). As a result, the weight-average molecular weight of the alkoxysilyl group-containing polymer was 165000. This alkoxysilyl group-containing polymer solution was used as a hydrophilic coating agent.

Example 8

To a flask having a volume of 500 mL, equipped with a nitrogen gas conduit, a condenser and a stirrer were added 49 g of N-acryloylaminopropyl-N,N-dimethylammonium-propyl-α-sulfoxybetaine, 0.35 g of 3-mercaptopropyltrimethoxysilane (manufactured by Shin-Etsu Chemical Co., Ltd., item number: KBM-803) as a silane coupling agent and 49.35 g of pure water. The pressure in the flask was reduced to remove the air from the flask, and thereafter the pressure in the flask was recovered to atmospheric pressure by introducing nitrogen gas into the flask, to remove oxygen gas from the flask as much as possible.

Next, the contents in the flask were warmed up to 65° C. in an oil bath with which the flask was equipped, and thereafter 0.10 g of 2,2'-azobis[2-methyl-N-(2-hydroxyethyl)propionamide] (manufactured by Wako Pure Chemical Industries, Ltd., item number: VA-086, molecular weight: 288.35) was added to the flask. The contents in the flask were aged while maintaining its temperature to 70° C. for 4 hours. Thereafter, 0.49 g of 2,2'-azobis[2-methyl-N-(2-hydroxyethyl)propionamide] was added to the flask, and the contents in the flask were aged for 4 hours while maintaining the temperature of the contents to 70° C., to give a polymer solution.

The polymer solution obtained in the above was cooled to 30° C. in a water bath, and the polymer solution was diluted with 394.8 g of water, to give a transparent alkoxysilyl group-containing polymer solution.

The weight-average molecular weight of the alkoxysilyl group-containing polymer contained in the alkoxysilyl group-containing polymer solution obtained in the above was determined by using a gel permeation chromatography (manufactured by Tosoh Corporation, item number: HLC-8320GPC). As a result, the weight-average molecular weight of the alkoxysilyl group-containing polymer was 105000. This alkoxysilyl group-containing polymer solution was used as a hydrophilic coating agent.

Example 9

To a flask having a volume of 500 mL, equipped with a nitrogen gas conduit, a condenser and a stirrer were added 49 g of N-acryloylaminopropyl-N,N-dimethylammonium-propyl-α-sulfoxybetaine, 0.35 g of 3-mercaptopropylt-rimethoxysilane (manufactured by Shin-Etsu Chemical Co., Ltd., item number: KBM-803) as a silane coupling agent and 115.15 g of pure water. The pressure in the flask was reduced to remove the air from the flask, and thereafter the pressure in the flask was recovered to atmospheric pressure by introducing nitrogen gas into the flask, to remove oxygen gas from the flask as much as possible.

Next, the contents in the flask were warmed up to 65° C. in an oil bath with which the flask was equipped, and thereafter 0.49 g of 2,2'-azobis[2-methyl-N-(2-hydroxy-ethyl)propionamide] (manufactured by Wako Pure Chemical Industries, Ltd., item number: VA-086, molecular weight: 288.35) was added to the flask. The contents in the flask were aged while maintaining its temperature to 70° C. for 4 hours. Thereafter, 0.49 g of 2,2'-azobis[2-methyl-N-(2-hydroxyethyl)propionamide] was added to the flask, and the contents in the flask were aged for 4 hours while maintaining the temperature of the contents to 70° C., to give a polymer solution.

The polymer solution obtained in the above was cooled to 30° C. in a water bath, and the polymer solution was diluted with 329.0 g of water, to give a transparent alkoxysilyl group-containing polymer solution.

The weight-average molecular weight of the alkoxysilyl group-containing polymer contained in the alkoxysilyl group-containing polymer solution obtained in the above was determined by using a gel permeation chromatography (manufactured by Tosoh Corporation, item number: HLC-8320GPC). As a result, the weight-average molecular weight of the alkoxysilyl group-containing polymer was 55000. This alkoxysilyl group-containing polymer solution was used as a hydrophilic coating agent.

Example 10

To a flask having a volume of 500 mL, equipped with a nitrogen gas conduit, a condenser and a stirrer were added 49 g of N-acryloylaminopropyl-N,N-dimethylammonium-propyl-α-sulfoxybetaine, 0.35 g of 3-mercaptopropylt-rimethoxysilane (manufactured by Shin-Etsu Chemical Co., Ltd., item number: KBM-803) as a silane coupling agent and 115.15 g of pure water. The pressure in the flask was reduced to remove the air from the flask, and thereafter the pressure in the flask was recovered to atmospheric pressure by introducing nitrogen gas into the flask, to remove oxygen gas from the flask as much as possible.

Next, the contents in the flask were warmed up to 65° C. in an oil bath with which the flask was equipped, and thereafter 0.99 g of 2,2'-azobis[2-methyl-N-(2-hydroxy-ethyl)propionamide] (manufactured by Wako Pure Chemical Industries, Ltd., item number: VA-086, molecular weight: 288.35) was added to the flask. The contents in the flask were aged while maintaining its temperature to 70° C. for 4 hours. Thereafter, 0.49 g of 2,2'-azobis[2-methyl-N-(2-hydroxyethyl)propionamide] was added to the flask, and the contents in the flask were aged for 4 hours while maintaining the temperature of the contents to 70° C., to give a polymer solution.

The polymer solution obtained in the above was cooled to 30° C. in a water bath, and the polymer solution was diluted with 329.0 g of water, to give a transparent alkoxysilyl group-containing polymer solution.

The weight-average molecular weight of the alkoxysilyl group-containing polymer contained in the alkoxysilyl group-containing polymer solution obtained in the above was determined by using a gel permeation chromatography (manufactured by Tosoh Corporation, item number: HLC-8320GPC). As a result, the weight-average molecular weight of the alkoxysilyl group-containing polymer was 32000. This alkoxysilyl group-containing polymer solution was used as a hydrophilic coating agent.

Example 11

To a flask having a volume of 500 mL, equipped with a nitrogen gas conduit, a condenser and a stirrer were added 49 g of N-acryloylaminopropyl-N,N-dimethylammonium-propyl-α-sulfoxybetaine, 0.35 g of 3-mercaptopropylt-rimethoxysilane (manufactured by Shin-Etsu Chemical Co., Ltd., item number: KBM-803) as a silane coupling agent and 197.40 g of pure water. The pressure in the flask was reduced to remove the air from the flask, and thereafter the pressure in the flask was recovered to atmospheric pressure by introducing nitrogen gas into the flask, to remove oxygen gas from the flask as much as possible.

Next, the contents in the flask were warmed up to 65° C. in an oil bath with which the flask was equipped, and thereafter 2.47 g of 2,2'-azobis[2-methyl-N-(2-hydroxy-ethyl)propionamide] (manufactured by Wako Pure Chemical Industries, Ltd., item number: VA-086, molecular weight: 288.35) was added to the flask. The contents in the flask were aged while maintaining its temperature to 70° C. for 4 hours. Thereafter, 0.49 g of 2,2'-azobis[2-methyl-N-(2-hydroxyethyl)propionamide] was added to the flask, and the contents in the flask were aged for 4 hours while maintaining the temperature of the contents to 70° C., to give a polymer solution.

The polymer solution obtained in the above was cooled to 30° C. in a water bath, and the polymer solution was diluted with 246.7 g of water, to give a transparent alkoxysilyl group-containing polymer solution.

The weight-average molecular weight of the alkoxysilyl group-containing polymer contained in the alkoxysilyl group-containing polymer solution obtained in the above was determined by using a gel permeation chromatography (manufactured by Tosoh Corporation, item number: HLC-8320GPC). As a result, the weight-average molecular weight of the alkoxysilyl group-containing polymer was 14000. This alkoxysilyl group-containing polymer solution was used as a hydrophilic coating agent.

Example 12

To a flask having a volume of 500 mL, equipped with a nitrogen gas conduit, a condenser and a stirrer were added 47 g of N-acryloylaminopropyl-N,N-dimethylammonium-propyl-α-sulfoxybetaine, 1.75 g of 3-mercaptopropylt-rimethoxysilane (manufactured by Shin-Etsu Chemical Co., Ltd., item number: KBM-803) as a silane coupling agent and 438.71 g of pure water. The pressure in the flask was reduced to remove the air from the flask, and thereafter the pressure in the flask was recovered to atmospheric pressure by introducing nitrogen gas into the flask, to remove oxygen gas from the flask as much as possible.

Next, the contents in the flask were warmed up to 65° C. in an oil bath with which the flask was equipped, and thereafter 4.87 g of 2,2'-azobis[2-methyl-N-(2-hydroxyethyl)propionamide] (manufactured by Wako Pure Chemical Industries, Ltd., item number: VA-086, molecular weight: 288.35) was added to the flask. The contents in the flask were aged while maintaining its temperature to 70° C. for 4 hours. Thereafter, 0.49 g of 2,2'-azobis[2-methyl-N-(2-hydroxyethyl)propionamide] was added to the flask, and the contents in the flask were aged for 4 hours while maintaining the temperature of the contents to 70° C., to give a polymer solution.

The polymer solution obtained in the above was cooled to 30° C., to give a transparent alkoxysilyl group-containing polymer solution.

The weight-average molecular weight of the alkoxysilyl group-containing polymer contained in the alkoxysilyl group-containing polymer solution obtained in the above was determined by using a gel permeation chromatography (manufactured by Tosoh Corporation, item number: HLC-8320GPC). As a result, the weight-average molecular weight of the alkoxysilyl group-containing polymer was 5000. This alkoxysilyl group-containing polymer solution was used as a hydrophilic coating agent.

Example 13

To the alkoxysilyl group-containing polymer solution obtained in Example 7, sodium chloride was added in a ratio of 10 parts by mass based on 100 parts by mass of the alkoxysilyl group-containing polymer, and the solution was stirred so as to be homogeneous, to give an alkoxysilyl group-containing polymer solution to which sodium chloride was added. The obtained alkoxysilyl group-containing polymer solution to which sodium chloride was added was transparent. This polymer solution was used as a hydrophilic coating agent.

Example 14

To the alkoxysilyl group-containing polymer solution obtained in Example 8, sodium chloride was added in a ratio of 10 parts by mass based on 100 parts by mass of the alkoxysilyl group-containing polymer, and the solution was stirred so as to be homogeneous, to give an alkoxysilyl group-containing polymer solution to which sodium chloride was added. The obtained alkoxysilyl group-containing polymer solution to which sodium chloride was added was transparent. This polymer solution was used as a hydrophilic coating agent.

Example 15

To the alkoxysilyl group-containing polymer solution obtained in Example 9, sodium chloride was added in a ratio of 10 parts by mass based on 100 parts by mass of the alkoxysilyl group-containing polymer, and the solution was stirred so as to be homogeneous, to give an alkoxysilyl group-containing polymer solution to which sodium chloride was added. The obtained alkoxysilyl group-containing polymer solution to which sodium chloride was added was transparent. This polymer solution was used as a hydrophilic coating agent.

Example 16

To the alkoxysilyl group-containing polymer solution obtained in Example 10, sodium chloride was added in a ratio of 10 parts by mass based on 100 parts by mass of the alkoxysilyl group-containing polymer, and the solution was stirred so as to be homogeneous, to give an alkoxysilyl group-containing polymer solution to which sodium chloride was added. The obtained alkoxysilyl group-containing polymer solution to which sodium chloride was added was transparent. This polymer solution was used as a hydrophilic coating agent.

Example 17

To the alkoxysilyl group-containing polymer solution obtained in Example 11, sodium chloride was added in a ratio of 10 parts by mass based on 100 parts by mass of the alkoxysilyl group-containing polymer, and the solution was stirred so as to be homogeneous, to give an alkoxysilyl group-containing polymer solution to which sodium chloride was added. The obtained alkoxysilyl group-containing polymer solution to which sodium chloride was added was transparent. This polymer solution was used as a hydrophilic coating agent.

Example 18

To the alkoxysilyl group-containing polymer solution obtained in Example 12, sodium chloride was added in a ratio of 10 parts by mass based on 100 parts by mass of the alkoxysilyl group-containing polymer, and the solution was stirred so as to be homogeneous, to give an alkoxysilyl group-containing polymer solution to which sodium chloride was added. The obtained alkoxysilyl group-containing polymer solution to which sodium chloride was added was transparent. This polymer solution was used as a hydrophilic coating agent.

Example 19

To a flask having a volume of 500 mL, equipped with a nitrogen gas conduit, a condenser and a stirrer were added 49 g of N-methacryloylaminopropyl-N,N-dimethylammoniumpropyl-α-sulfoxybetaine (manufactured by Sigma-Aldrich Co. LLC., item number: 473170-50G), 0.33 g of 3-mercaptopropyltrimethoxysilane (manufactured by Shin-Etsu Chemical Co., Ltd., item number: KBM-803) as a silane coupling agent and 49.33 g of pure water. The pressure in the flask was reduced to remove the air from the flask, and thereafter the pressure in the flask was recovered to atmospheric pressure by introducing nitrogen gas into the flask, to remove oxygen gas from the flask as much as possible.

Next, the contents in the flask were warmed up to 65° C. in an oil bath with which the flask was equipped, and thereafter 0.10 g of 2,2'-azobis[2-methyl-N-(2-hydroxyethyl)propionamide] (manufactured by Wako Pure Chemical Industries, Ltd., item number: VA-086, molecular weight: 288.35) was added to the flask. The contents in the flask were aged while maintaining its temperature to 70° C. for 4 hours. Thereafter, 0.49 g of 2,2'-azobis[2-methyl-N-2-hydroxyethyl)propionamide] was added to the flask, and the contents in the flask were aged for 4 hours while maintaining the temperature of the contents to 70° C., to give a polymer solution.

The polymer solution obtained in the above was cooled to 30° C., and the polymer solution was diluted with 394.7 g of water, to give a transparent alkoxysilyl group-containing polymer solution.

The weight-average molecular weight of the alkoxysilyl group-containing polymer contained in the alkoxysilyl group-containing polymer solution obtained in the above was determined by using a gel permeation chromatography (manufactured by Tosoh Corporation, item number: HLC-8320GPC). As a result, the weight-average molecular weight of the alkoxysilyl group-containing polymer was 107000.

To the alkoxysilyl group-containing polymer solution obtained in the above, sodium chloride was added in a ratio of 10 parts by mass based on 100 parts by mass of the alkoxysilyl group-containing polymer, and the solution was stirred so as to be homogeneous, to give an alkoxysilyl group-containing polymer solution to which sodium chloride was added. The obtained alkoxysilyl group-containing polymer solution to which sodium chloride was added was transparent. This polymer solution was used as a hydrophilic coating agent.

Example 20

To a flask having a volume of 500 mL, equipped with a nitrogen gas conduit, a condenser and a stirrer were added 49 g of N-acryloylaminopropyl-N,N-dimethylammoniumpropyl-α-sulfoxybetaine (manufactured by Sigma-Aldrich Co. LLC., item number: 473152-5G), 0.37 g of 3-mercaptopropyltrimethoxysilane (manufactured by Shin-Etsu Chemical Co., Ltd., item number: KBM-803) as a silane coupling agent and 49.37 g of pure water. The pressure in the flask was reduced to remove the air from the flask, and thereafter the pressure in the flask was recovered to atmospheric pressure by introducing nitrogen gas into the flask, to remove oxygen gas from the flask as much as possible.

Next, the contents in the flask were warmed up to 65° C. in an oil bath with which the flask was equipped, and thereafter 0.10 g of 2,2'-azobis[2-methyl-N-(2-hydroxyethyl)propionamide] (manufactured by Wako Pure Chemical Industries, Ltd., item number: VA-086, molecular weight: 288.35) was added to the flask. The contents in the flask were aged while maintaining its temperature to 70° C. for 4 hours. Thereafter, 0.49 g of 2,2'-azobis[2-methyl-N-(2-hydroxyethyl)propionamide] was added to the flask, and the contents in the flask were aged for 4 hours while maintaining the temperature of the contents to 70° C., to give a polymer solution.

The polymer solution obtained in the above was cooled to 30° C., and the polymer solution was diluted with 394.9 g of water, to give a transparent alkoxysilyl group-containing polymer solution.

The weight-average molecular weight of the alkoxysilyl group-containing polymer contained in the alkoxysilyl group-containing polymer solution obtained in the above was determined by using a gel permeation chromatography (manufactured by Tosoh Corporation, item number: HLC-8320GPC). As a result, the weight-average molecular weight of the alkoxysilyl group-containing polymer was 104000.

To the alkoxysilyl group-containing polymer solution obtained in the above, sodium chloride was added in a ratio of 10 parts by mass based on 100 parts by mass of the alkoxysilyl group-containing polymer, and the solution was stirred so as to be homogeneous, to give an alkoxysilyl group-containing polymer solution to which sodium chloride was added. The obtained alkoxysilyl group-containing polymer solution to which sodium chloride was added was transparent. This polymer solution was used as a hydrophilic coating agent.

Example 21

To a flask having a volume of 500 mL, equipped with a nitrogen gas conduit, a condenser and a stirrer were added 49 g of N-methacryloyloxypropyl-N,N-dimethylammoniumpropyl-α-sulfoxybetaine (manufactured by Sigma-Aldrich Co. LLC., item number: 473153-50G), 0.35 g of 3-mercaptopropyltrimethoxysilane (manufactured by Shin-Etsu Chemical Co., Ltd., item number: KBM-803) as a silane coupling agent and 49.35 g of pure water. The pressure in the flask was reduced to remove the air from the flask, and thereafter the pressure in the flask was recovered to atmospheric pressure by introducing nitrogen gas into the flask, to remove oxygen gas from the flask as much as possible.

Next, the contents in the flask were warmed up to 65° C. in an oil bath with which the flask was equipped, and thereafter 0.10 g of 2,2'-azobis[2-methyl-N-(2-hydroxyethyl)propionamide] (manufactured by Wako Pure Chemical Industries, Ltd., item number: VA-086, molecular weight: 288.35) was added to the flask. The contents in the flask were aged while maintaining its temperature to 70° C. for 4 hours. Thereafter, 0.49 g of 2,2'-azobis[2-methyl-N-(2-hydroxyethyl)propionamide] was added to the flask, and the contents in the flask were aged for 4 hours while maintaining the temperature of the contents to 70° C., to give a polymer solution.

The polymer solution obtained in the above was cooled to 30° C., and the polymer solution was diluted with 394.8 g of water, to give a transparent alkoxysilyl group-containing polymer solution.

The weight-average molecular weight of the alkoxysilyl group-containing polymer contained in the alkoxysilyl group-containing polymer solution obtained in the above was determined by using a gel permeation chromatography (manufactured by Tosoh Corporation, item number: HLC-8320GPC). As a result, the weight-average molecular weight of the alkoxysilyl group-containing polymer was 105000.

To the alkoxysilyl group-containing polymer solution obtained in the above, sodium chloride was added in a ratio of 10 parts by mass based on 100 parts by mass of the alkoxysilyl group-containing polymer, and the solution was stirred so as to be homogeneous, to give an alkoxysilyl group-containing polymer solution to which sodium chloride was added. The obtained alkoxysilyl group-containing polymer solution to which sodium chloride was added was transparent. This polymer solution was used as a hydrophilic coating agent.

Example 22

To a flask having a volume of 500 mL, equipped with a nitrogen gas conduit, a condenser and a stirrer were added 49 g of N-acryloylaminoethyl-N,N-dimethylammoniummethyl-α-carboxybetaine (manufactured by Osaka Organic Chemical Industry Ltd., item number: CMBAm), 0.48 g of 3-mercaptopropyltrimethoxysilane (manufactured by Shin-Etsu Chemical Co., Ltd., item number: KBM-803) as a silane coupling agent and 49.48 g of pure water. The pressure in the flask was reduced to remove the air from the flask, and thereafter the pressure in the flask was recovered to atmospheric pressure by introducing nitrogen gas into the flask, to remove oxygen gas from the flask as much as possible.

Next, the contents in the flask were warmed up to 65° C. in an oil bath with which the flask was equipped, and thereafter 0.10 g of 2,2'-azobis[2-methyl-N-(2-hydroxyethyl)propionamide] (manufactured by Wako Pure Chemical Industries, Ltd., item number: VA-086, molecular weight: 288.35) was added to the flask. The contents in the flask were aged while maintaining its temperature to 70° C. for 4 hours. Thereafter, 0.49 g of 2,2'-azobis[2-methyl-N-(2-hydroxyethyl)propionamide] was added to the flask, and the contents in the flask were aged for 4 hours while maintaining the temperature of the contents to 70° C., to give a polymer solution.

The polymer solution obtained in the above was cooled to 30° C., and the polymer solution was diluted with 395.9 g of water, to give a transparent alkoxysilyl group-containing polymer solution.

The weight-average molecular weight of the alkoxysilyl group-containing polymer contained in the alkoxysilyl group-containing polymer solution obtained in the above was determined by using a gel permeation chromatography (manufactured by Tosoh Corporation, item number: HLC-8320GPC). As a result, the weight-average molecular weight of the alkoxysilyl group-containing polymer was 109000.

To the alkoxysilyl group-containing polymer solution obtained in the above, sodium chloride was added in a ratio of 10 parts by mass based on 100 parts by mass of the alkoxysilyl group-containing polymer, and the solution was stirred so as to be homogeneous, to give an alkoxysilyl group-containing polymer solution to which sodium chloride was added. The obtained alkoxysilyl group-containing polymer solution to which sodium chloride was added was transparent. This polymer solution was used as a hydrophilic coating agent.

Example 23

To a flask having a volume of 500 mL, equipped with a nitrogen gas conduit, a condenser and a stirrer were added 49 g of N-methacryloyloxyethyl-N,N-dimethylammoniumethyl-α-carboxybetaine (manufactured by Osaka Organic Chemical Industry Ltd., item number: GLBT), 0.48 g of 3-mercaptopropyltrimethoxysilane (manufactured by Shin-Etsu Chemical Co., Ltd., item number: KBM-803) as a silane coupling agent and 49.45 g of pure water. The pressure in the flask was reduced to remove the air from the flask, and thereafter the pressure in the flask was recovered to atmospheric pressure by introducing nitrogen gas into the flask, to remove oxygen gas from the flask as much as possible.

Next, the contents in the flask were warmed up to 65° C. in an oil bath with which the flask was equipped, and thereafter 0.10 g of 2,2'-azobis[2-methyl-N-(2-hydroxyethyl)propionamide] (manufactured by Wako Pure Chemical Industries, Ltd., item number: VA-086, molecular weight: 288.35) was added to the flask. The contents in the flask were aged while maintaining its temperature to 70° C. for 4 hours. Thereafter, 0.49 g of 2,2'-azobis[2-methyl-N-(2-hydroxyethyl)propionamide] was added to the flask, and the contents in the flask were aged for 4 hours while maintaining the temperature of the contents to 70° C., to give a polymer solution.

The polymer solution obtained in the above was cooled to 30° C., and the polymer solution was diluted with 395.6 g of water, to give a transparent alkoxysilyl group-containing polymer solution.

The weight-average molecular weight of the alkoxysilyl group-containing polymer contained in the alkoxysilyl group-containing polymer solution obtained in the above was determined by using a gel permeation chromatography (manufactured by Tosoh Corporation, item number: HLC-8320GPC). As a result, the weight-average molecular weight of the alkoxysilyl group-containing polymer was 104000.

To the alkoxysilyl group-containing polymer solution obtained in the above, sodium chloride was added in a ratio of 10 parts by mass based on 100 parts by mass of the alkoxysilyl group-containing polymer, and the solution was stirred so as to be homogeneous, to give an alkoxysilyl group-containing polymer solution to which sodium chloride was added. The obtained alkoxysilyl group-containing polymer solution to which sodium chloride was added was transparent. This polymer solution was used as a hydrophilic coating agent.

Example 24

To a flask having a volume of 500 mL, equipped with a nitrogen gas conduit, a condenser and a stirrer were added 49 g of 2-methacryloyloxyethylphosphorylcholine (manufactured by Tokyo Chemical Industry Co., Ltd., item number: M2005), 0.33 g of 3-mercaptopropyltrimethoxysilane (manufactured by Shin-Etsu Chemical Co., Ltd., item number: KBM-803) as a silane coupling agent and 49.33 g of pure water. The pressure in the flask was reduced to remove the air from the flask, and thereafter the pressure in the flask was recovered to atmospheric pressure by introducing nitrogen gas into the flask, to remove oxygen gas from the flask as much as possible.

Next, the contents in the flask were warmed up to 65° C. in an oil bath with which the flask was equipped, and thereafter 0.10 g of 2,2'-azobis[2-methyl-N-(2-hydroxyethyl)propionamide] (manufactured by Wako Pure Chemical Industries, Ltd., item number: VA-086, molecular weight: 288.35) was added to the flask. The contents in the flask were aged while maintaining its temperature to 70° C. for 4 hours. Thereafter, 0.49 g of 2,2'-azobis[2-methyl-N-(2-hydroxyethyl)propionamide] was added to the flask, and the contents in the flask were aged for 4 hours while maintaining the temperature of the contents to 70° C., to give a polymer solution.

The polymer solution obtained in the above was cooled to 30° C., and the polymer solution was diluted with 394.6 g of water, to give a transparent alkoxysilyl group-containing polymer solution.

The weight-average molecular weight of the alkoxysilyl group-containing polymer contained in the alkoxysilyl group-containing polymer solution obtained in the above was determined by using a gel permeation chromatography (manufactured by Tosoh Corporation, item number: HLC-8320GPC). As a result, the weight-average molecular weight of the alkoxysilyl group-containing polymer was 105000.

To the alkoxysilyl group-containing polymer solution obtained in the above, sodium chloride was added in a ratio of 10 parts by mass based on 100 parts by mass of the alkoxysilyl group-containing polymer, and the solution was stirred so as to be homogeneous, to give an alkoxysilyl group-containing polymer solution to which sodium chloride was added. The obtained alkoxysilyl group-containing polymer solution to which sodium chloride was added was transparent. This polymer solution was used as a hydrophilic coating agent.

Comparative Example 1

To a flask having a volume of 500 mL, equipped with a nitrogen gas conduit, a condenser and a stirrer were added 49 g of acrylamide (manufactured by Kishida Chemical Co., Ltd., item number: 020-01225), 0.68 g of 3-mercaptopropyltrimethoxysilane (manufactured by Shin-Etsu Chemical Co., Ltd., item number: KBM-803) as a silane coupling agent and 74.52 g of pure water. The pressure in the flask was reduced to remove the air from the flask, and thereafter the pressure in the flask was recovered to atmospheric pressure by introducing nitrogen gas into the flask, to remove oxygen gas from the flask as much as possible.

Next, the contents in the flask were warmed up to 65° C. in an oil bath with which the flask was equipped, and thereafter 0.05 g of 2,2'-azobis[2-methyl-N-(2-hydroxyethyl)propionamide] (manufactured by Wako Pure Chemical Industries, Ltd., item number: VA-086, molecular weight: 288.35) was added to the flask. The contents in the flask were aged while maintaining its temperature to 70° C. for 4 hours. Thereafter, 0.49 g of 2,2'-azobis[2-methyl-N-(2-hydroxyethyl)propionamide] was added to the flask, and the contents in the flask were aged for 4 hours while maintaining the temperature of the contents to 70° C., to give a polymer solution.

The polymer solution obtained in the above was cooled to 30° C., and the polymer solution was diluted with 372.6 g of water, to give a transparent alkoxysilyl group-containing polymer solution.

The weight-average molecular weight of the alkoxysilyl group-containing polymer contained in the alkoxysilyl group-containing polymer solution obtained in the above was determined by using a gel permeation chromatography (manufactured by Tosoh Corporation, item number: HLC-8320GPC). As a result, the weight-average molecular weight of the alkoxysilyl group-containing polymer was 105000.

To the alkoxysilyl group-containing polymer solution obtained in the above, sodium chloride was added in a ratio of 10 parts by mass based on 100 parts by mass of the alkoxysilyl group-containing polymer, and the solution was stirred so as to be homogeneous, to give an alkoxysilyl group-containing polymer solution to which sodium chloride was added. The obtained alkoxysilyl group-containing polymer solution to which sodium chloride was added was transparent. This polymer solution was used as a hydrophilic coating agent.

Comparative Example 2

To a flask having a volume of 500 mL, equipped with a nitrogen gas conduit, a condenser and a stirrer were added 49 g of dimethylaminoethylacrylatemethylchloride quaternary salt (manufactured by Osaka Organic Chemical Industry Ltd., item number: DMAMC), 0.50 g of 3-mercaptopropyltrimethoxysilane (manufactured by Shin-Etsu Chemical Co., Ltd., item number: KBM-803) as a silane coupling agent and 49.50 g of pure water. The pressure in the flask was reduced to remove the air from the flask, and thereafter the pressure in the flask was recovered to atmospheric pressure by introducing nitrogen gas into the flask, to remove oxygen gas from the flask as much as possible.

Next, the contents in the flask were warmed up to 65° C. in an oil bath with which the flask was equipped, and thereafter 0.10 g of 2,2'-azobis[2-methyl-N-(2-hydroxyethyl)propionamide] (manufactured by Wako Pure Chemical Industries, Ltd., item number: VA-086, molecular weight: 288.35) was added to the flask. The contents in the flask were aged while maintaining its temperature to 70° C. for 4 hours. Thereafter, 0.49 g of 2,2'-azobis[2-methyl-N-(2-hydroxyethyl)propionamide] was added to the flask, and the contents in the flask were aged for 4 hours while maintaining the temperature of the contents to 70° C., to give a polymer solution.

The polymer solution obtained in the above was cooled to 30° C., and the polymer solution was diluted with 396.0 g of water, to give a transparent alkoxysilyl group-containing polymer solution.

The weight-average molecular weight of the alkoxysilyl group-containing polymer contained in the alkoxysilyl group-containing polymer solution obtained in the above was determined by using a gel permeation chromatography (manufactured by Tosoh Corporation, item number: HLC-8320GPC). As a result, the weight-average molecular weight of the alkoxysilyl group-containing polymer was 105000.

To the alkoxysilyl group-containing polymer solution obtained in the above, sodium chloride was added in a ratio of 10 parts by mass based on 100 parts by mass of the alkoxysilyl group-containing polymer, and the solution was stirred so as to be homogeneous, to give an alkoxysilyl group-containing polymer solution to which sodium chloride was added. The obtained alkoxysilyl group-containing polymer solution to which sodium chloride was added was transparent. This polymer solution was used as a hydrophilic coating agent.

Comparative Example 3

To a flask having a volume of 500 mL, equipped with a nitrogen gas conduit, a condenser and a stirrer were added 49 g of methoxytriethyleneglycol acrylate (manufactured by Osaka Organic Chemical Industry Ltd., item number: V#MTG), 0.45 g of 3-mercaptopropyltrimethoxysilane (manufactured by Shin-Etsu Chemical Co., Ltd., item number: KBM-803) as a silane coupling agent and 49.45 g of pure water. The pressure in the flask was reduced to remove the air from the flask, and thereafter the pressure in the flask was recovered to atmospheric pressure by introducing nitrogen gas into the flask, to remove oxygen gas from the flask as much as possible.

Next, the contents in the flask were warmed up to 65° C. in an oil bath with which the flask was equipped, and thereafter 0.10 g of 2,2'-azobis[2-methyl-N-(2-hydroxyethyl)propionamide] (manufactured by Wako Pure Chemical Industries, Ltd., item number: VA-086, molecular weight: 288.35) was added to the flask. The contents in the flask were aged while maintaining its temperature to 70° C. for 4 hours. Thereafter, 0.49 g of 2,2'-azobis[2-methyl-N-(2-hydroxyethyl)propionamide] was added to the flask, and the contents in the flask were aged for 4 hours while maintaining the temperature of the contents to 70° C., to give a polymer solution.

The polymer solution obtained in the above was cooled to 30° C., and the polymer solution was diluted with 395.6 g of water, to give a transparent alkoxysilyl group-containing polymer solution.

The weight-average molecular weight of the alkoxysilyl group-containing polymer contained in the alkoxysilyl group-containing polymer solution obtained in the above was determined by using a gel permeation chromatography (manufactured by Tosoh Corporation, item number: HLC-8320GPC). As a result, the weight-average molecular weight of the alkoxysilyl group-containing polymer was 105000.

To the alkoxysilyl group-containing polymer solution obtained in the above, sodium chloride was added in a ratio of 10 parts by mass based on 100 parts by mass of the alkoxysilyl group-containing polymer, and the solution was stirred so as to be homogeneous, to give an alkoxysilyl group-containing polymer solution to which sodium chloride was added. The obtained alkoxysilyl group-containing polymer solution to which sodium chloride was added was transparent. This polymer solution was used as a hydrophilic coating agent.

Comparative Example 4

As a hydrophilic coating agent, 0.1% aqueous solution of sodium dodecylsulfate solution (manufactured by Kishida Chemical Co., Ltd., item number: 010-71935) was used.

Experimental Example

Next, each hydrophilic coating agent obtained in each Example or each Comparative example was applied to a glass plate (length: 100 mm, width: 100 mm, thickness: 1 mm) by flow coating, and the surplus of the hydrophilic coating agent was removed from the glass plate by washing with ethanol. Thereafter, this glass plate was placed in a warm-air dryer, and dried by warm-air-drying at a temperature of 120° C. for 30 minutes, to give a surface-modified substrate.

As the physical properties of the surface treatment substrate obtained in the above, contact angle with water, anti-fogging property, water resistance, retention of anti-fogging property and abrasion resistance were evaluated in accordance with the following methods. Its results are shown in Table 1.

(Contact Angle with Water)

The contact angle of the surface-modified substrate with water was determined by means of an automatic contact angle meter (manufactured by Kyowa Interface Science Co., Ltd., item number: DM-501Hi). Incidentally, when the contact angle with water is at highest 10 degrees, hydrophilicity is evaluated as excellent.

(Anti-Fogging Property)

The surface of the surface treatment agent on the surface-modified substrate was observed with naked eyes when breath was blown onto the surface treatment agent in the air (temperature: 25° C., relative humidity: 50%), and anti-fogging property was evaluated in accordance with the following criteria for evaluation.

(Criteria for Evaluation)

⊚: There was no fog.
○: There was no fog, but irregularity was generated slightly on a water film.
Δ: There was no fog, but irregularity was generated considerably on a water film.
x: Fog was generated.

(Water Resistance)

The surface-modified substrate was dipped in pure water, and ultrasonic cleaning of the surface-modified substrate was carried out for 10 minutes. The surface-modified substrate was taken out from the pure water, and dried naturally. After that, the surface of the surface treatment agent on the surface-modified substrate was observed with naked eyes when breath was blown onto the surface treatment agent in the air (temperature: 25° C., relative humidity: 50%), and water resistance was evaluated in accordance with the following criteria for evaluation.

(Criteria for Evaluation)

⊚: There was no fog.
○: There was no fog, but irregularity was generated slightly on a water film.
Δ: There was no fog, but irregularity was generated considerably on a water film.
x: Fog was generated.

(Retention of Anti-Fogging [Retention of Anti-Fogging Property])

The surface-modified substrate was allowed to stand in the air (temperature: 25° C., relative humidity: 50%) for 180 days. After that, the surface of the surface treatment agent on the surface-modified substrate was observed with naked eyes when breath was blown onto the surface treatment agent, and water resistance was evaluated in accordance with the following criteria for evaluation.

(Criteria for Evaluation)

⊚: There was no fog.
○: There was no fog, but irregularity was generated slightly on a water film.
Δ: There was no fog, but irregularity was generated considerably on a water film.
x: Fog was generated.

(Abrasion Resistance)

The surface-modified substrate was placed horizontally, and a nonwoven fabric was placed on the substrate. The substrate was reciprocatedly rubbed 100 times with the nonwoven fabric while applying a pressure of 500 g to the nonwoven fabric. After that, the surface of the surface treatment agent on the surface-modified substrate was observed with naked eyes when breath was blown onto the surface treatment agent in the air (temperature: 25° C., relative humidity: 50%), and abrasion resistance was evaluated in accordance with the following criteria for evaluation.

(Criteria for Evaluation)

⊚: There was no fog.
○: There was no fog, but irregularity was generated slightly on a water film.
Δ: There was no fog, but irregularity was generated considerably on a water film.
x: Fog was generated.

Next, the evaluation of ⊚ was counted as 25 points, the evaluation of ○ was counted as 20 points, the evaluation of Δ was counted as 10 points, and the evaluation of x was counted as 0 point. The total evaluation was examined by summing up each point in each item (maximum: 100 points). Its results are shown in Table 1.

TABLE 1

| Example/Comp. Ex. | Appearance | Physical properties of hydrophilic coating agent | | | | | |
|---|---|---|---|---|---|---|---|
| | | Contact angle (degree) | Anti-fogging property | Water resistance | Retention of anti-fogging property | Abrasion resistance | Total evaluation |
| Example 1 | transparent | 5.1 | ⊚ | ⊚ | ⊚ | Δ | 75 |
| Example 2 | transparent | 5.2 | ⊚ | ⊚ | ⊚ | ⊚ | 100 |
| Example 3 | transparent | 5.1 | ⊚ | ⊚ | ⊚ | ⊚ | 100 |
| Example 4 | transparent | 4.9 | ⊚ | ⊚ | ⊚ | ⊚ | 100 |
| Example 5 | transparent | 5.1 | ⊚ | ⊚ | ⊚ | ⊚ | 100 |
| Example 6 | slightly white | 5.0 | ⊚ | ⊚ | ⊚ | ⊚ | 100 |
| Example 7 | transparent | 4.9 | ⊚ | ⊚ | ⊚ | Δ | 85 |
| Example 8 | transparent | 4.4 | ⊚ | ⊚ | ⊚ | Δ | 85 |
| Example 9 | transparent | 3.8 | ⊚ | ⊚ | ⊚ | Δ | 85 |

TABLE 1-continued

| Example/Comp. Ex. | Appearance | Contact angle (degree) | Anti-fogging property | Water resistance | Retention of anti-fogging property | Abrasion resistance | Total evaluation |
|---|---|---|---|---|---|---|---|
| Example 10 | transparent | 3.4 | ⊚ | ⊚ | ⊚ | Δ | 85 |
| Example 11 | transparent | 3.1 | ⊚ | ⊚ | ⊚ | Δ | 85 |
| Example 12 | transparent | 2.9 | ⊚ | ⊚ | ⊚ | Δ | 85 |
| Example 13 | transparent | 5.1 | ⊚ | ⊚ | ⊚ | ⊚ | 100 |
| Example 14 | transparent | 4.3 | ⊚ | ⊚ | ⊚ | ⊚ | 100 |
| Example 15 | transparent | 3.6 | ⊚ | ⊚ | ⊚ | Δ | 85 |
| Example 16 | transparent | 3.5 | ⊚ | ⊚ | ⊚ | Δ | 85 |
| Example 17 | transparent | 3.2 | ⊚ | ⊚ | ⊚ | Δ | 85 |
| Example 18 | transparent | 2.8 | ⊚ | ⊚ | ⊚ | Δ | 85 |
| Example 19 | transparent | 4.3 | ⊚ | ⊚ | ⊚ | ⊚ | 100 |
| Example 20 | transparent | 4.5 | ⊚ | ⊚ | ○ | ○ | 90 |
| Example 21 | transparent | 4.2 | ⊚ | ⊚ | Δ | ○ | 80 |
| Example 22 | transparent | 3.6 | ⊚ | ⊚ | ○ | ○ | 90 |
| Example 23 | transparent | 3.2 | ⊚ | ⊚ | Δ | ○ | 80 |
| Example 24 | transparent | 3.6 | ⊚ | ⊚ | Δ | ○ | 80 |
| Comp. Ex. 1 | transparent | 3.4 | ⊚ | ⊚ | X | X | 50 |
| Comp. Ex. 2 | transparent | 3.5 | ⊚ | ⊚ | X | X | 50 |
| Comp. Ex. 3 | transparent | 18.6 | X | ⊚ | X | X | 25 |
| Comp. Ex. 4 | transparent | 2.4 | ⊚ | X | ○ | X | 45 |

From the results as shown in Table 1, it can be seen that each hydrophilic coating agent obtained in each Example is comprehensively excellent in hydrophilicity, anti-fogging property, retention of anti-fogging property and water resistance. Also, it can be seen that the hydrophilic coating agents obtained in Examples 2 to 6, Examples 13 to 14 and Example 19 are remarkably excellent in abrasion resistance, because the hydrophilic coating agents contain an alkoxysilyl group-containing polymer having a weight-average molecular weight of not less than 100000, and a salt.

INDUSTRIAL APPLICABILITY

The hydrophilic coating agent of the present invention is comprehensively excellent in hydrophilicity, anti-fogging property, retention of anti-fogging property and water resistance. Therefore, the hydrophilic coating agent of the present invention is expected to be used in, for example, uses such as an anti-fogging film; an optical article such as an anti-reflection film, an optical filter, a spectacle lens, an optical lens, a prism or a beam splitter; a mirror; an optical article for anti-reflection which is used on the surface of a screen, such as a liquid crystal display, a plasma display, an electroluminescent display, a CRT display or a projection-type television; a window or a body for automobiles and the like; an exterior wall and a window glass of buildings and the like; a body and a window glass of an aircraft and the like; a water section equipment such as a kitchen, a bathroom or a rest room; a solar panel; a touch panel for an LCD monitor and the like; an inside wall of a water pipe; or a primer coating for use in electroplating; and the like.

The invention claimed is:

1. A hydrophilic coating agent for forming a film having hydrophilicity, comprising an alkoxysilyl group-containing polymer prepared by polymerizing a monomer component comprising a betaine monomer and an alkoxysilyl group-containing compound, wherein the alkoxysilyl group-containing compound is an alkoxysilyl group-containing compound represented by the formula (IV):

(IV)

wherein each of $R^{17}$, $R^{18}$ and $R^{19}$ is independently an alkyl group having 1 to 4 carbon atoms or an alkoxy group having 1 to 4 carbon atoms, and at least one of $R^{17}$, $R^{18}$ and $R^{19}$ is an alkoxy group having 1 to 4 carbon atoms, and $R^{20}$ is an alkylene group having 1 to 12 carbon atoms; an azobis(trialkoxysilyl) compound represented by the formula (V):

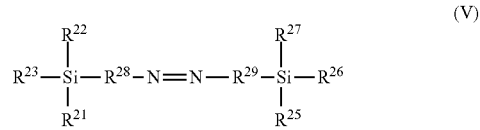

(V)

wherein each of $R^{22}$ to $R^{27}$ is independently an alkyl group having 1 to 4 carbon atoms or an alkoxy group having 1 to 4 carbon atoms, and at least one of $R^{22}$ to $R^{27}$ is an alkoxy group having 1 to 4 carbon atoms, and each of $R^{28}$ and $R^{29}$ is independently an alkylene group having 1 to 12 carbon atoms, and one or two methylene groups included in the alkylene group can be substituted with —O— group, —C(O)O— group, —O(O)C— group, —NH— group, —CO— group, an arylene group, urethane bond or 1,2-imidazoline group, 2,2'-azobis[2-(1-(triethoxysilylpropylcarbamoyl)-2-imidazoline-2-yl)propane]; or 2,2'-azobis[N-[2-(triethoxysilylpropylcarbamoyl)ethyl]isobutylamide].

2. The hydrophilic coating agent according to claim 1, wherein the betaine monomer is at least one betaine monomer selected from the group consisting of a sulfoxybetaine monomer, a carboxybetaine monomer and a phosphorylbetaine monomer.

3. The hydrophilic coating agent according to claim 2, wherein the sulfoxybetaine monomer is a sulfoxybetaine monomer having (meth)acryloyl group.

4. The hydrophilic coating agent according to claim 2, wherein the sulfoxybetaine monomer is a sulfoxybetaine monomer represented by the formula (I):

[Chem. 1]

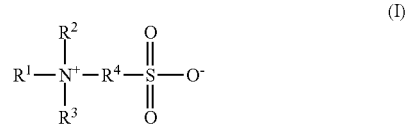
(I)

wherein $R^1$ is a (meth)acryloylaminoalkyl group having an alkyl group of 1 to 4 carbon atoms or a (meth) acryloyloxyalkyl group having an alkyl group of 1 to 4 carbon atoms, each of $R^2$ and $R^3$ is independently hydrogen atom, an alkyl group having 1 to 4 carbon atoms, a hydroxyalkyl group having 1 to 4 carbon atoms or a (meth)acryloyloxyalkyl group having an alkyl group of 1 to 4 carbon atoms, and $R^4$ is an alkylene group having 1 to 4 carbon atoms or an oxyalkylene group having 1 to 4 carbon atoms.

5. The hydrophilic coating agent according to claim 4, wherein $R^1$ in the formula (I) is a group represented by the formula (Ia):

[Chem. 2]

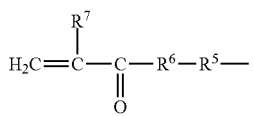
(Ia)

wherein $R^5$ is an alkylene group having 1 to 4 carbon atoms or an oxyalkylene group having 1 to 4 carbon atoms, $R^6$ is oxygen atom or —NH— group, and $R^7$ is hydrogen atom or methyl group.

6. The hydrophilic coating agent according to claim 2, wherein the carboxybetaine monomer is a carboxybetaine monomer represented by the formula (II):

[Chem. 3]

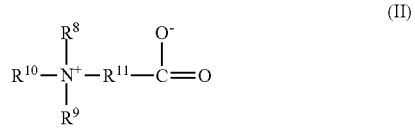
(II)

wherein each of $R^8$ and $R^9$ is independently hydrogen atom or an alkyl group having 1 to 4 carbon atoms, $R^{10}$ is a (meth)acryloyloxyalkyl group having 1 to 4 carbon atoms, and $R^{11}$ is an alkylene group having 1 to 4 carbon atoms.

7. The hydrophilic coating agent according to claim 2, wherein the phosphorylbetaine monomer is a phosphorylbetaine monomer represented by the formula (III):

[Chem. 4]

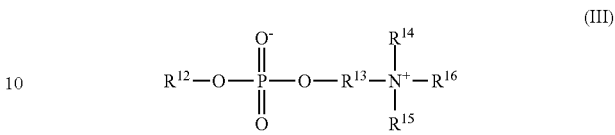
(III)

wherein $R^{12}$ is a (meth)acryloyloxyalkyl group having an alkyl group of 1 to 4 carbon atoms, $R^{13}$ is an alkylene group having 1 to 4 carbon atoms, and each of $R^{14}$, $R^{15}$ and $R^{16}$ is independently hydrogen atom or an alkyl group having 1 to 4 carbon atoms.

8. The hydrophilic coating agent according to claim 1, wherein the alkoxysilyl group-containing polymer has a weight-average molecular weight of not less than 100000.

9. The hydrophilic coating agent according to claim 1, further comprising an inorganic salt and/or an organic salt.

10. A film having anti-fogging property, wherein the film is formed from the hydrophilic coating agent according to claim 1.

11. A product having a surface on which an anti-fogging layer is formed, wherein said anti-fogging layer is formed from the hydrophilic coating agent according to claim 1.

12. The hydrophilic coating agent according to claim 1, wherein the alkoxysilyl group-containing compound is an azobis(trialkoxysilyl) compound represented by the formula (V).

13. The hydrophilic coating agent according to claim 12, wherein the azobis(trialkoxysilyl) compound represented by the formula (V) is 2,2'-azobis[2-(1-(trimethoxysilylpropylcarbamoyl)-2-imidazoline-2-yl)propane], 2,2'-azobis[2-(1-(triethoxysilylpropylcarbamoyl)-2-imidazoline-2-yl)propane], 2,2'-azobis[2-(1-(tripropoxysilylpropylcarbamoyl)-2-imidazoline-2-yl)propane], 2,2'-azobis[N-[2-(trimethoxysilylpropylcarbamoyl)ethyl]isobutylamide], 2,2'-azobis[N-[2-(triethoxysilylpropylcarbamoyl)ethyl]isobutylamide] or 2,2'-azobis[N-[2-(tripropoxysilylpropylcarbamoyl)ethyl]isobutylamide].

14. The hydrophilic coating agent according to claim 1, wherein the betaine monomer is N-(meth)acryloylaminopropyl-N,N-dimethylammoniumpropyl-α-sulfoxybetaine, N-(meth)acryloyloxypropyl-N,N-dimethylammoniumpropyl-α-sulfoxybetaine, N-(meth)acryloylaminoethyl-N,N-dimethylammoniummethyl-α-carboxybetaine, N-(meth)acryloyloxyethyl-N,N-dimethylammoniummethyl-α-carboxybetaine or 2-(meth)acryloyloxyethylphosphorylchloline.

* * * * *